United States Patent [19]

Nelson et al.

[11] Patent Number: 4,587,651
[45] Date of Patent: May 6, 1986

[54] DISTRIBUTED VARIABLE BANDWIDTH SWITCH FOR VOICE, DATA, AND IMAGE COMMUNICATIONS

[75] Inventors: Gary A. Nelson, Irvine; Patrick N. Godding, Tustin; Richard E. Schumaker, Orange; Keith D. Walter, Irvine; Edward S. Marrone, Los Angeles; Stillman F. Gates, Anaheim; Everett O. Rigsbee, III, San Rafael; Michael D. Teener, Irvine, all of Calif.

[73] Assignee: CXC Corporation, Irvine, Calif.

[21] Appl. No.: 491,551

[22] Filed: May 4, 1983

[51] Int. Cl.⁴ .................. H04J 3/00; H04J 3/16; H04Q 11/04
[52] U.S. Cl. ......................... 370/88; 370/68; 370/89; 370/104
[58] Field of Search .................. 370/68, 88, 86, 94, 370/104, 111, 825.5, 89

[56] References Cited

U.S. PATENT DOCUMENTS

| | | | |
|---|---|---|---|
| 3,731,002 | 5/1973 | Pierce | 370/88 |
| 3,890,471 | 6/1975 | Hachenburg | 370/88 |
| 3,922,497 | 11/1975 | Acton et al. | 370/111 |
| 4,081,612 | 3/1978 | Hafner | 370/60 |
| 4,129,750 | 12/1978 | Mattern | 370/88 |
| 4,190,821 | 2/1980 | Woodward | 370/88 |
| 4,205,326 | 5/1980 | Porter et al. | 370/86 |
| 4,251,880 | 2/1981 | Baugh et al. | 370/86 |
| 4,262,357 | 4/1981 | Shima | 370/60 |
| 4,307,378 | 12/1981 | Clark | 370/60 |
| 4,314,233 | 2/1982 | Clark | 370/60 |
| 4,317,197 | 2/1982 | Ulug | 370/94 |
| 4,347,498 | 8/1982 | Lee et al. | 370/94 |
| 4,370,744 | 1/1983 | Hirano et al. | 370/88 |
| 4,375,097 | 2/1983 | Ulug | 370/94 |
| 4,413,258 | 11/1983 | Quick, Jr. et al. | 370/94 |
| 4,430,651 | 2/1984 | Bryant et al. | 370/94 |
| 4,435,705 | 3/1984 | Stevens | 370/86 |

Primary Examiner—Douglas W. Olms
Assistant Examiner—Curtis Kuntz
Attorney, Agent, or Firm—Knobbe, Martens, Olson & Bear

[57] ABSTRACT

A variable bandwidth branch exchange system is disclosed for interfacing a network ring to a plurality of peripheral loops, each of the peripheral loops being connected to one or more local stations and to a node on the network ring. Time bit slots on the network ring signal stream are assigned, on a dynamic basis, for communication between local stations. The network ring signal stream is diverted to the peripheral loop by the node when the bit slots assigned to the local station connected to that loop become accessible at the node, thereby placing the peripheral loop in the network ring signal stream. Bit slot bandwidth is variable in accordance with the requirements of a particular local station. Voice, data, and image communications are supported. The modular nature of the system permits the implementation of multiple rings for wide area networking.

49 Claims, 25 Drawing Figures

EXAMPLE OF DISTRIBUTED SWITCHING SYSTEM USING DUAL-RING TRANSMISSION

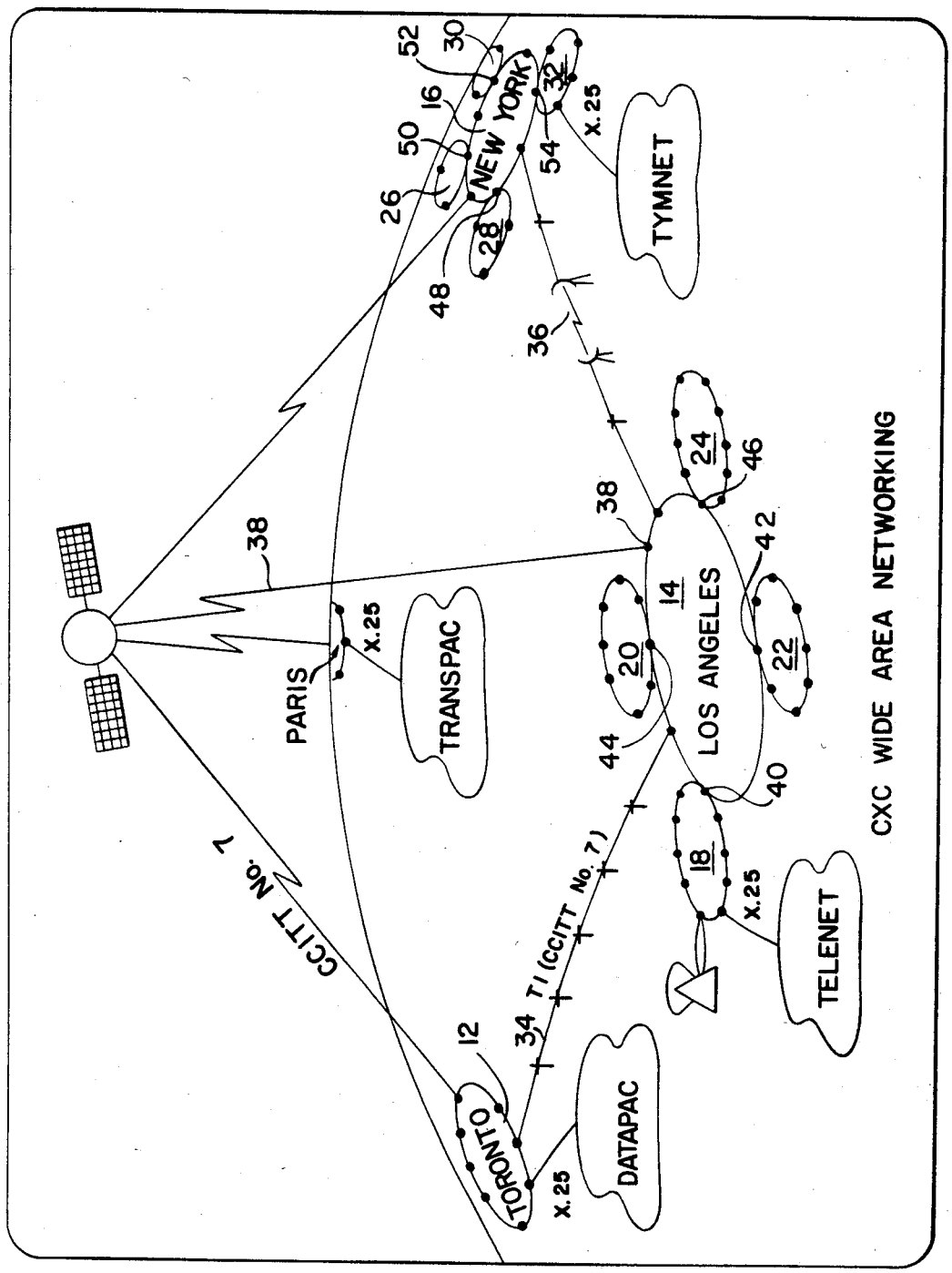
FIG. 2(a) CXC WIDE AREA NETWORKING

EXAMPLE OF DISTRIBUTED SWITCHING
SYSTEM USING DUAL-RING TRANSMISSION

EXTERNAL BLOCK DIAGRAM OF SWITCHING NODE

EXEMPLARY SIGNAL FRAME ON NETWORK LOOP

CLEAR CHANNEL DATA
FLOW THROUGH NODE

RING INTERFACE AND CONTROL UNIT (RICU)

FLOW DIAGRAM OF DATA FROM PERIPHERAL LOOP THROUGH NODE TO NETWORK LOOP

INTERNAL CONFIGURATION OF SWITCHING NODE

RF MODEM BLOCK DIAGRAM

DETAILED DIAGRAM OF DATA STEERING MODULE (50)

STATION INTERFACE MODULE (SIM) BLOCK DIAGRAM

PLS BLOCK DIAGRAM

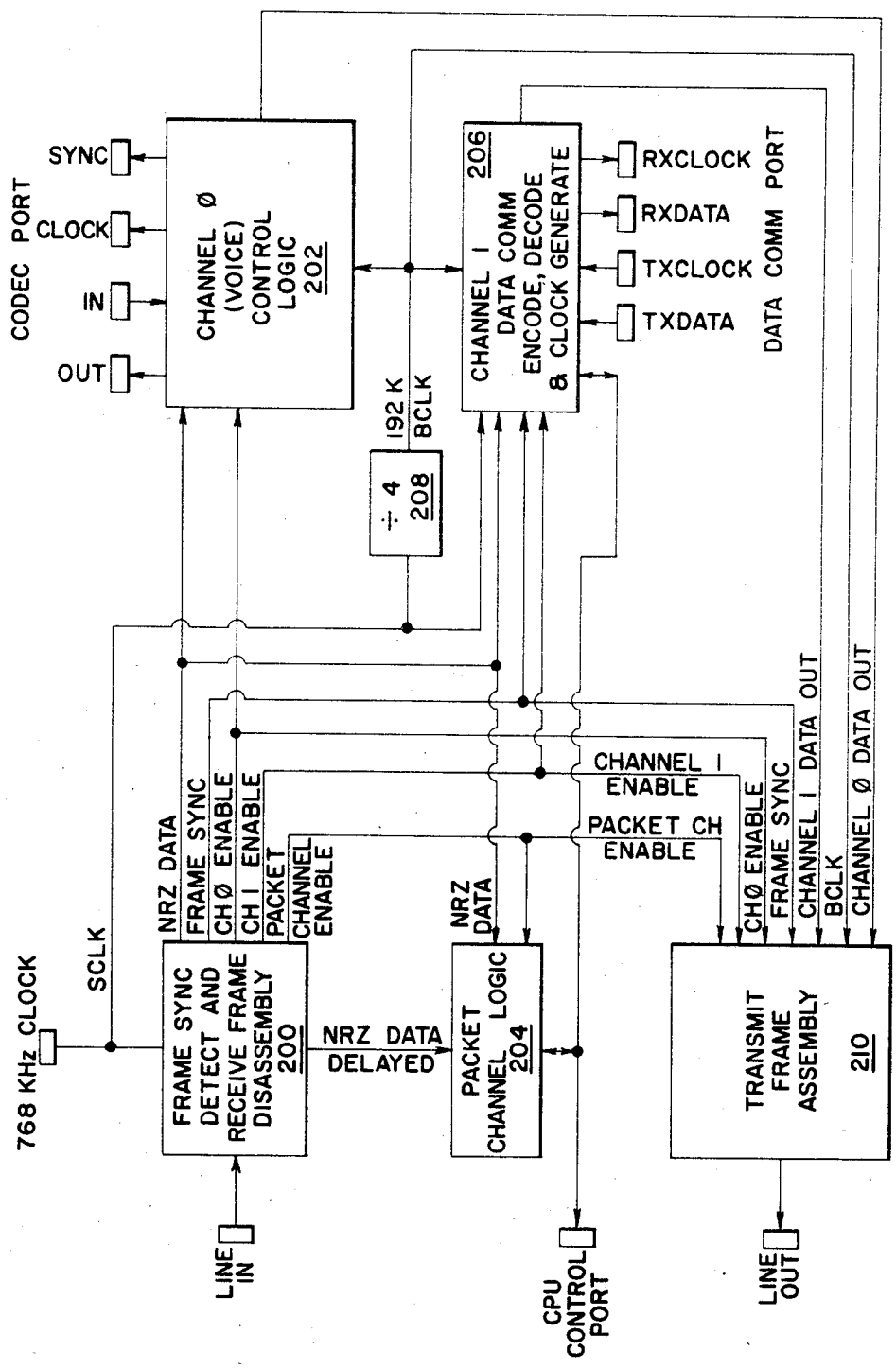
FIG. 12(a) BLOCK DIAGRAM OF MICROTELEPHONE CONTROLLER

DETAILED BLOCK DIAGRAM OF SIGNALING AND TIMING LOGIC FOR MTC

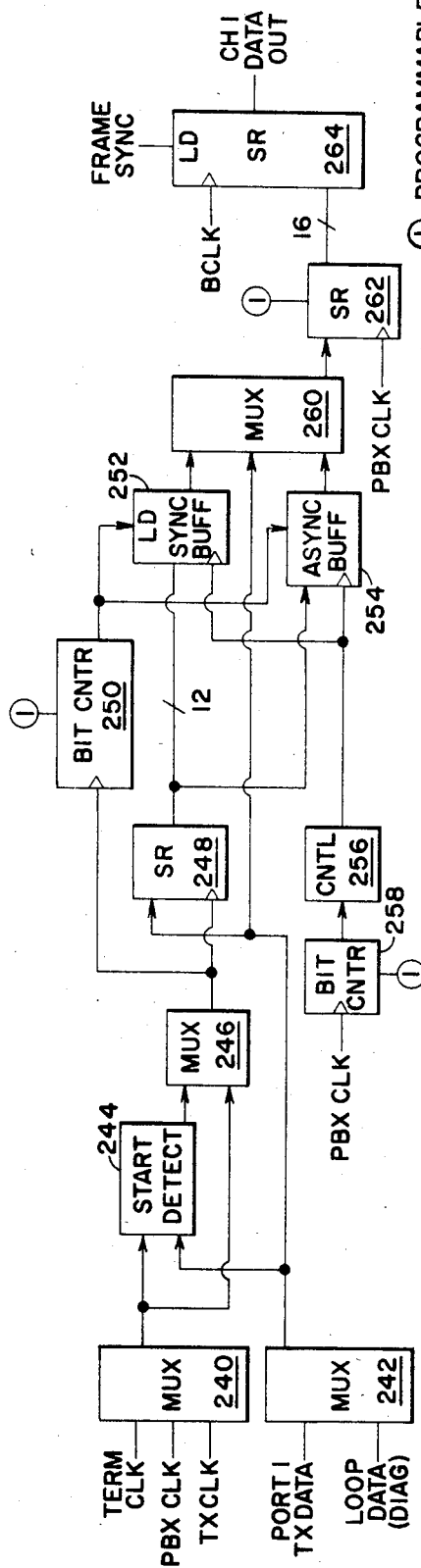
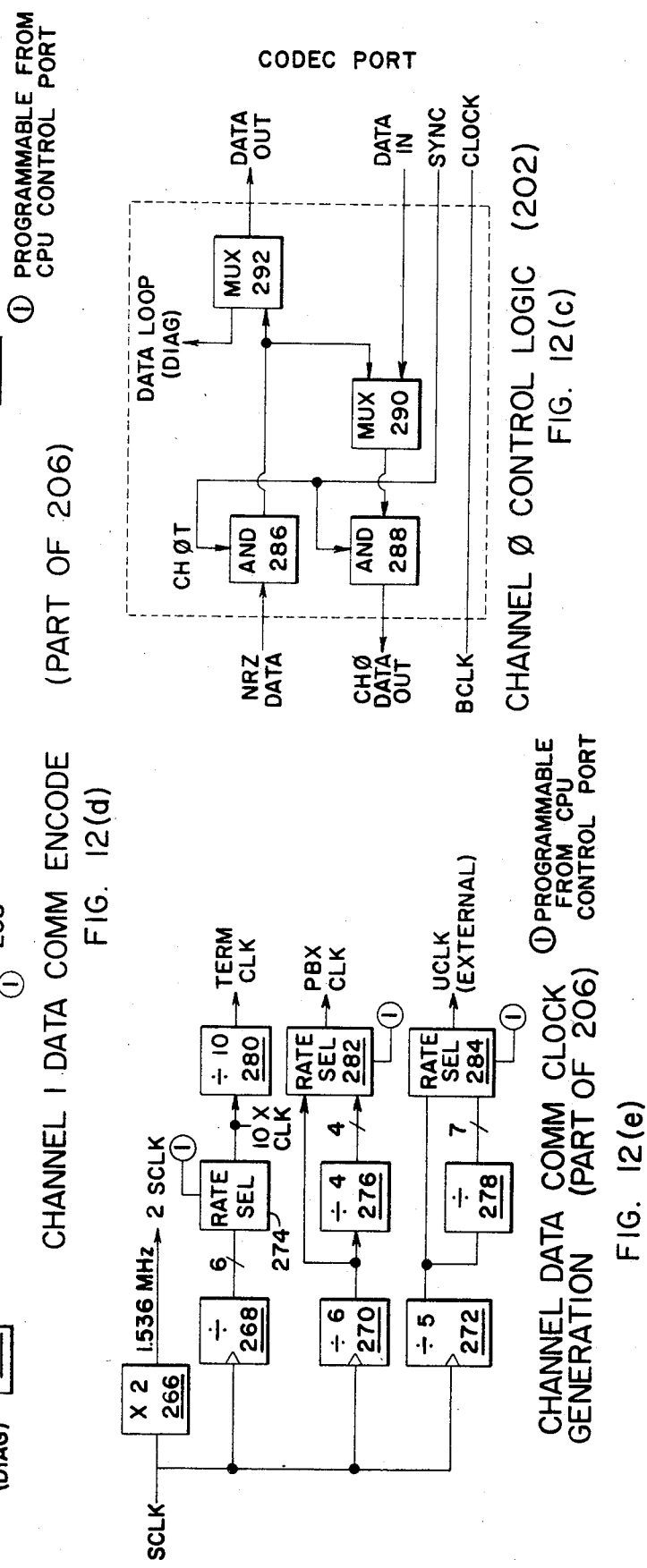

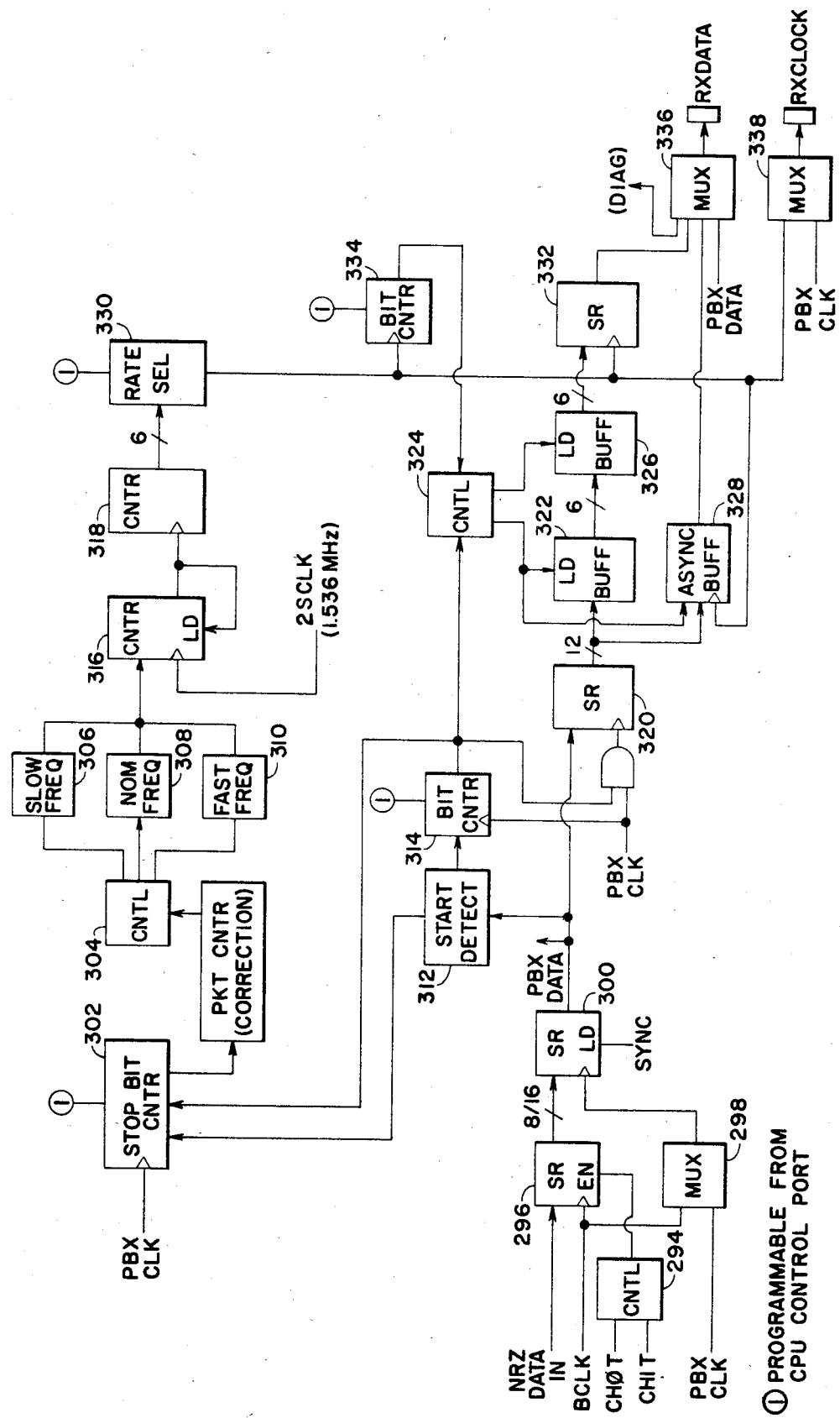
FIG. 12(f) CHANNEL I DATA COMM DECODE (PART OF 206)

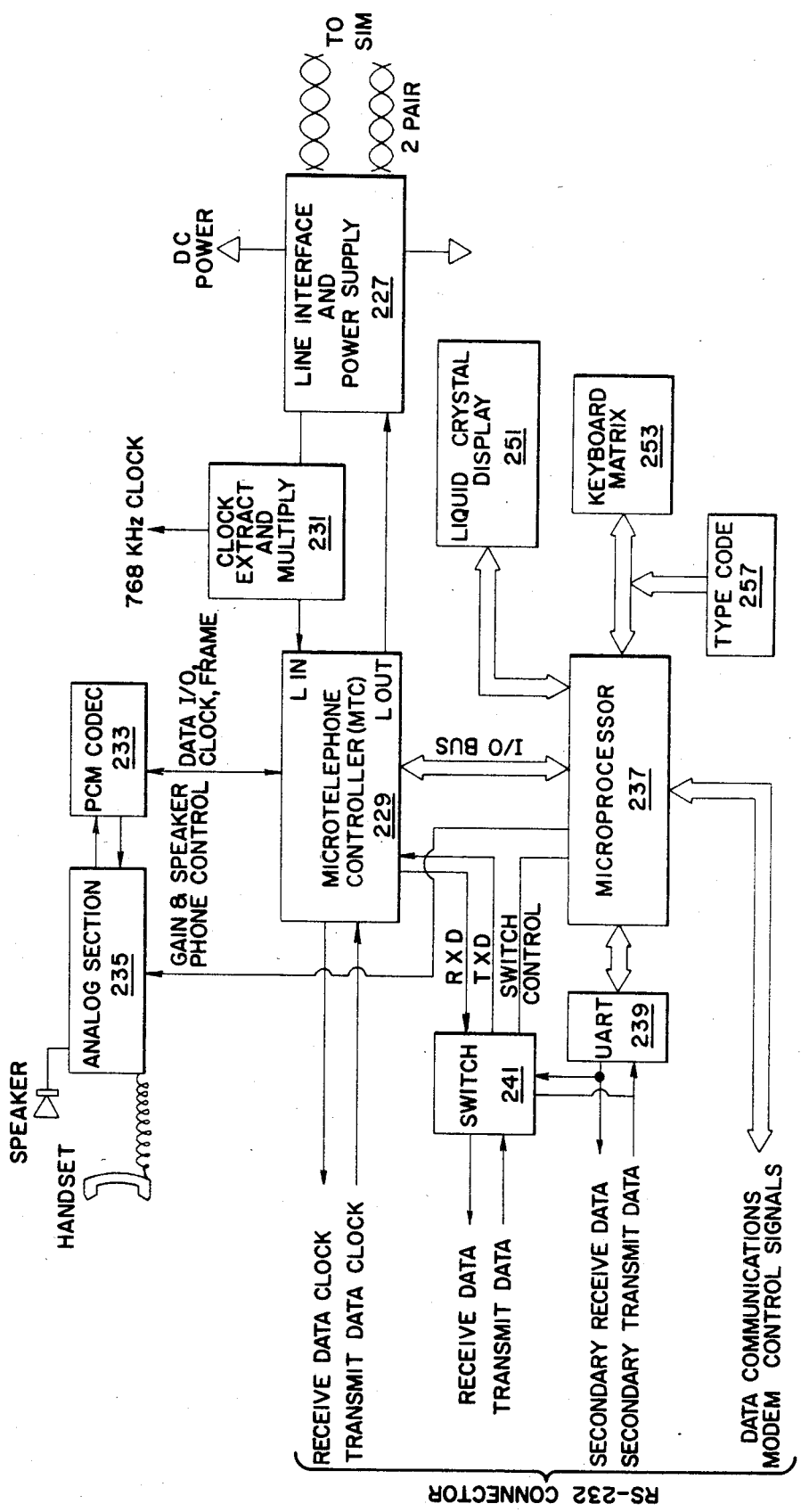
FIG. 13  BLOCK DIAGRAM OF TYPICAL VOICE AND DATA TERMINAL

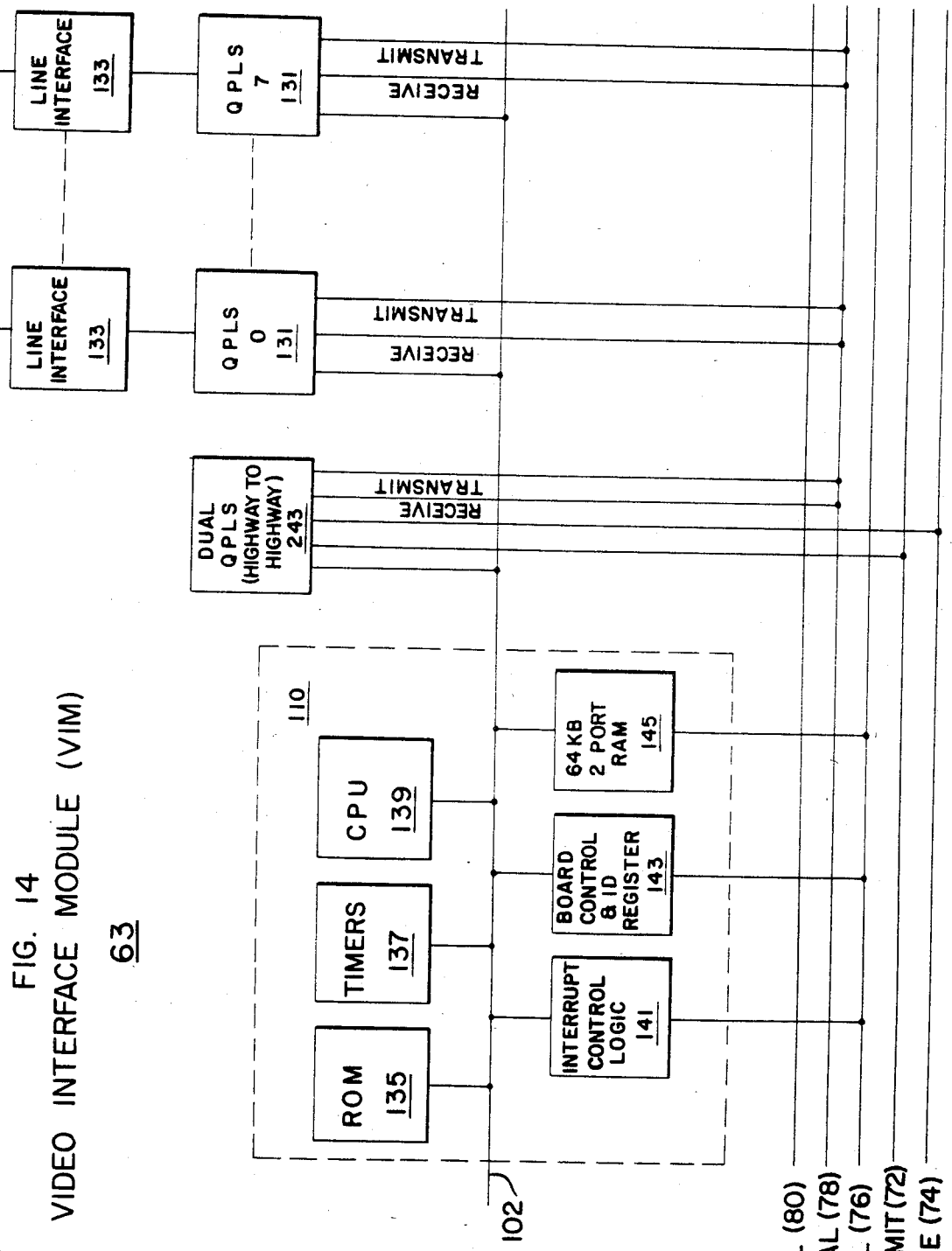

DISTRIBUTED VARIABLE BANDWIDTH SWITCH FOR VOICE, DATA, AND IMAGE COMMUNICATIONS

BACKGROUND OF THE INVENTION

This invention relates to distributed voice/data/image switching systems and more particularly to circuitry for dynamic allocation of bandwidth and circuit paths between switching nodes in a ring communication system.

In recent years a number of local area network (LAN) technologies have developed which allow for interconnection of a large number of data devices on a contention basis. Shared resources on the local area network are typically called servers; e.g., print servers, file servers, or communication servers. Conceptually, the present invention may be considered a system of distributed switching servers that may employ several different means for affecting internodal communication. Two of the embodiments described employ the services of a local area network: one uses a baseband bus LAN, and another employs an integrated token ring LAN. In a third embodiment, control of internodal communications may be affected by common signaling channels within the network signal stream.

The advantages of distributed switching are well known: e.g., improved reliability, improved availability, improved survivability, and reduced installation in wiring costs. However, a fundamental obstacle has prevented the widespread adoption of distributed switching, that obstacle being connectivity or allocation of circuit paths among the various nodes of the network.

Most present day switching systems employ star architectures or distributed star architectures. In the star architecture, a large central switch is employed and all stations are wired to a central location; the wiring cost is high and survivability low. A distributed star still employs a large central switch but reduces the wiring requirements by multiplexing many conversations or circuit paths onto the wiring between the central switch and peripheral switching units. The connectivity between peripheral switching units is limited to the number of circuit paths carried on the multiplexed wiring between the central switch and the peripheral switching units (PSU). Connectivity is not a problem when the switch is non-blocked, i.e. there is a circuit path for every station in the system. However, in many cases the cost of a non-blocked system is excessive and some level of blocking is introduced in order to reduce the cost per station of the system.

In the distributed star, blocking may be introduced in the PSU. Consequently, all stations on the PSU may contend for the number of circuits that exist between the PSU and the central switch. Typically the number of calls initiated per unit time varies from one PSU to another. To obtain a desired grade of service, i.e. the likelihood that a circuit path will be available for a call, it is thus necessary to balance the load on the PSU's by physically changing the number of telephones wired thereto. Because of the dynamic nature of modern businesses, the offered load to each PSU changes with time necessitating an ongoing process of traffic analysis followed by physically disconnecting and reconnecting telephones from one PSU to another. That process is both costly and time consuming.

To ensure a fixed grade of service requires a significantly larger ratio of circuits to telephone sets (telesets) when the number of circuits is small. Therefore, a more desirable system would allow the number of circuits per PSU to vary dynamically in accordance with the number of associated telesets. Ideally, the system would allow for the offered load from a local station to contend for all the circuits of the central switch rather than to contend for the small and fixed number of circuits at an individual PCU. The invention herein described addresses these issues and problems.

It is therefore a general object of this invention to provide distributed voice, data, and image PBX communications in a form that solves the limited connectivity problem found in present day systems.

A further object of this invention is to integrate important aspects of voice, data, and image communications into a single distributed system that provides means to accomplish: single and multi-party voice connections both intrasystem and to the public switched voice network; point-to-point, multipoint, and loop data connections; terminal concentration to local area networks; terminal concentration to public packet data networks; modem pooling; digital video switching; wide-area networking; and gateways between local and/or wide area networks.

It is a further object of the invention to provide a modular system that permits growth from a small single node system to a multinode system with essentially uniform cost per line or port.

It is another object of the invention to provide a system that may be configured with either blocking or non-blocking service both at the system and individual resource levels.

It is a further object of this invention to provide a system having the capability to allow the traffic load to be offered to the pool of traffic capacity at the highest network level when a system is configured for blocking service.

It is another object of this invention to provide a system that allows variable bandwidth switching between the nodes of the distributed switch so as to maximize the total traffic capacity in an integrated voice, data, and digital video environment.

It is a further object of this invention to provide a system that combines circuit switching and local area network packet switching so as to present the user with the best capabilities of both types of systems, thus allowing the system to be configured to the specific requirements of each application.

It is another object of this invention to provide a system having the flexibility to be dynamically configured in various commonly used data communications connection topologies: point-to-point, multipoint and loop.

SUMMARY OF THE INVENTION

In accordance with the present invention, there is provided a ring network system wherein messages at a node may be transmitted along the primary network loop or selectively diverted to peripheral loops interconnected at a common node. Both the primary network loop and the peripheral loop are adapted to provide variable bandwidth message carrying capacity. The invention may be incorporated in either a single loop configuration, or a redundant double-loop configuration with counter rotating data flow. In redundant double-loop configuration one loop may be used to carry circuit switched voice and data while the other loop may carry digitized video or other high-speed data channels. Thus voice, data and digitized video transmissions may be integrated into a single distributed communication system having the capability to recover from catastrophic equipment and cabling failures.

The remote stations on the peripheral loops may operate in synchronization with the network loop, and may utilize the network capacity as necessary on a dynamic basis. Inactive stations and/or stations engaged in intranodal communications need not utilize any of the network capacity.

A synchronous time division multiplexed ring is employed to provide circuit paths between switching nodes. A local area network may be utilized to provide circuit communication paths between nodes and to carry data for users from the system.

This invention allows each node to employ as much of the ring network bandwidth as is required to meet its communication need. The presently preferred embodiment of the invention emloys over 4,000 individually allocatable bit stream segments of 8,000 bps each. Eight channels are provided that may be allocated 1, 2, 4, or 8 at a time, providing incremental bandwidths of 8, 16, 32 and 64 kbps. An alternate embodiment may allocate channels 1, 2, 3, 4, 5, 6, 7 or 8 at a time to provide bandwidths of 8, 16, 24, 32, 40, 48, 56, or 64 kbps. In addition, eight 64 kbps channels can be concatenated to provide transmission paths of as much as 512 kbps per second. These high speed channels can be used to accommodate integrated voice, data, and digital compressed video workstations.

In the presently preferred embodiment, circuit switched data communications traffic may be encoded and carried within synchronous channels, whose capacity is an integer power of two times 8000 bps. Thus, all data traffic below 8000 bps (e.g., 50 bps, 1200 bps, or 4800 bps) may be carried at 8000 bps. 9600 bps traffic may be carried at 16 kbps. 19,200 bps traffic may be carried at 32 kbps. 38.4 kbps and 56 kbps traffic may be carried at 64 kbps.

Both packet switched and circuit switched data services may be integrated with circuit switched voice at a digital telephone station on each peripheral loop. The presently preferred embodiment of the invention employs 64 kbps pulse code modulation (PCM) encoding of voice. However, the variable bandwidth nature of the system allows for incorporation of other encoding methods which operate at 32 kbps, 16 kbps, 8 kbps, or lower.

BRIEF DESCRIPTION OF THE DRAWINGS

The foregoing objects, features, and advantages as well as others of the invention will be more fully comprehended from the following description and accompanying drawings in which:

FIG. 2(a) is an illustration of wide area networking in accordance with the present invention.

FIG. 12(a) is a block diagram of the microtelephone controller (MTC).

FIGS. 12(b)-(f) are block diagrams of portions of the circuitry within the micro telephone controller.

FIG. 13 is a block diagram of a typical integrated voice and data teleset.

FIG. 14 is a block diagram of a video interface module (VIM).

DETAILED DESCRIPTION OF THE DRAWINGS

Contemporary PBX System

Figure 1A:
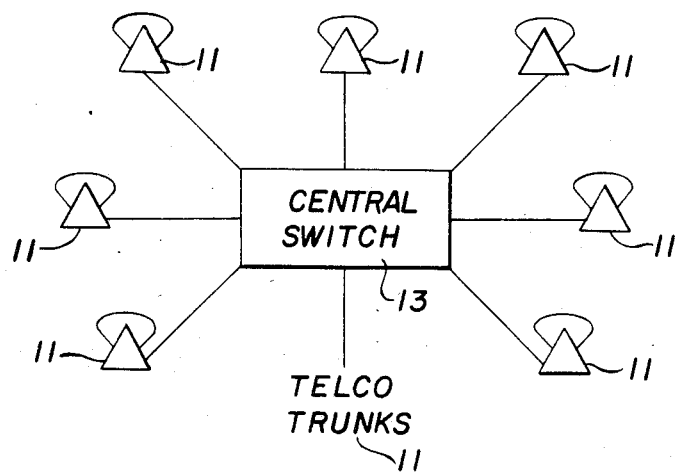
FIG. 1(a) is an illustration of a contemporary star architecture PBX.

FIG. 1(a) illustrates a representative star architecture PBX such as one currently produced by Lexar Corporation. The system may accommodate transmission of digitized voice, data and signaling. The central switch 13 is a time slot interchange that typically provides two time slots for each station connected to the central switch. In this manner, the system operates in a non-blocking mode, providing total connectivity for all peripheral voice and data devices 11. In some applications the non-blocking nature of such products can be advantageous because no traffic engineering is required to obtain an adequate level of performance. However, such products suffer from a significant lack of flexibility because the total system size is limited, absolutely, to the traffic capacity of the central switch.

Other contemporary systems, such as the Model SX-2000 system produced by Mitel Corporation, have addressed the expansion requirement by adding a switching module that effectively doubles the capacity of the time slot interchange. The additional time slots are made available for communication to other switching systems. The economic disadvantages of this approach are most apparent when one considers expanding an SX-2000 from 2,000 ports to 4,000 ports. Two SX-2000 switches are required, each with an expansion module which expands capacity to 4,000 time slots. Thus, in order to build a 4,000-port switch, the equivalent of two 4,000-port switches are required. Expanding such a system to a larger number of lines, e.g. 10,000 lines, would similarly require interconnecting five SX-2000 switches, each with the aforementioned expansion module. The fundamental problem of connectivity in distributed switching is then encountered because only 500 tie lines are available between pairs of switches. In such systems, the numbers of tie lines between pairs of switches is fixed because such tie lines are hardwired. There is no notion of dynamic reconfiguration of connectivity in such systems.

Figure 1B:
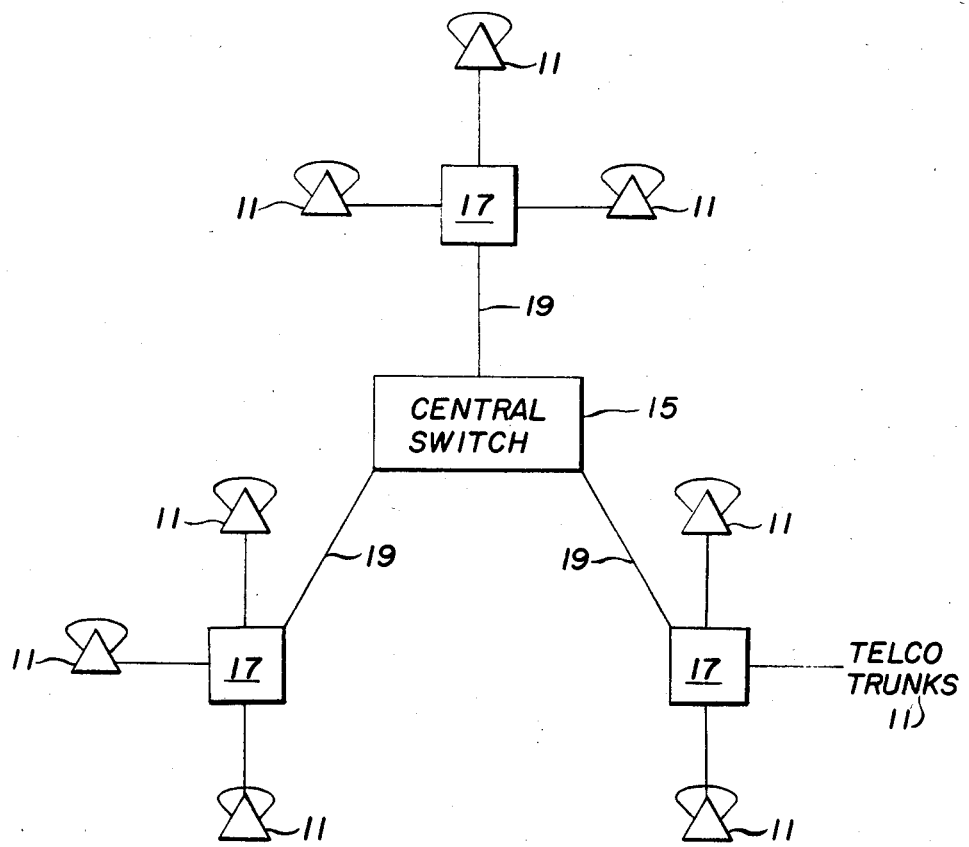
FIG. 1(b) is an illustration of a contemporary distributed star PBX.

The distributed star PBX illustrated in FIG. 1b is representative of commercial systems currently available, such as the SL-1 system produced by Northern Telecom, Inc. The primary switching element is time slot interchange (TSI) 15, which is connected to each of the peripheral switching units (PSU) 17 by means of communication paths 19 which typically operate at 2.048 Mbps and carry 30 channels of PCM voice traffic. Individual stations 11(a)–(f) are separately connected to PSU's.

All communications between a station connected to one PSU and a station connected to another PSU must proceed via the communication paths through the TSI 15. Moreover, in many cases, even signals between stations connected to a common PSU must also be conducted via the communication paths to the TSI, where the signal is then channeled back to the originating PSU. In such constructions, the individual stations are typically hardwired through the PSU to the TSI which introduces all switching functions. The PSU in such a case performs no blocking of the traffic signals communicated to the TSI. Such a system is inherently inefficient because it uses system bandwidth for intra-PSU traffic and the traffic load is offered to several communication paths, each with a fixed capacity of 30 channels. Data transmission in such systems typically uses a full 64 kbps time slot even if the data speed is, for example, only 4800 bps.

In some other contemporary systems the PSU serves as an intercom switch to channel local traffic without the need for communicating the local siganl to the TSI. However, such systems retain the inherent fixed level of connectivity associated with the branch connecting to the TSI, and also remain statistically inefficient due to the poorer utilization of the total pool of time slots.

Overview of Ring Network Switching

As detailed below the ring system provided in the present invention allows dynamic allocation of the network ring paths, thereby providing dynamic connectivity as well as variable bandwidth circuits. This allows systems to grow from a single node to a non-blocked configuration and then to a blocked configuration while using the same modular switching elements called nodes.

FIG. 2(a) is an illustration of wide area networking in accordance with the present invention. This figure is intended to illustrate potential application of the present invention for interconnecting various traffic pools located substantial distances apart. Network connections between pools may be accomplished by means of dedicated or switched land line connections 34, by light or microwave links 36, by satellite links 38, or by other means. Large ring based systems can be constructed using two levels of switching as illustrated in the Figure. Several first level switching rings 12, 14 and 16 may connect to one or more second level rings 18, 20, 22, 24, 26, 28, 30 and 32. The bridges 40, 42, 44, 46, 48, 50 and 52, that interconnect the two rings are constructed from the same basic modules as the switching nodes. Connectivity between the two rings is established by assemblies called highway-to-highway interface modules (HIM's), shown in FIG. 6(a) below. Each HIM is a plugable assembly that provides a number of variable bandwidth channels from the first level ring to the second level ring. A bridge can be populated with a number of these highway interface modules sufficient to provide capacity for the maximum level of connectivity required. Those variable bandwidth channels, or "tie-line channels", are dynamically allocated and, when not in use, do not consume bandwidth from either the first or second level ring. The HIM operates as a variable bandwidth TSI which makes it possible for any station on a first level ring to access any other station on another first level ring via the resources of the second level ring. The rings so tied can operate at any bandwidth, e.g. from 8,000 bps to 512 kbps, as described below. Thus, both the bandwidth and the connectivity for inter ring communications are dynamically allocatable. Thus, for example, connectivity between first level ring 14 and second level ring 20 may be dynamically controlled.

Figure 2B:
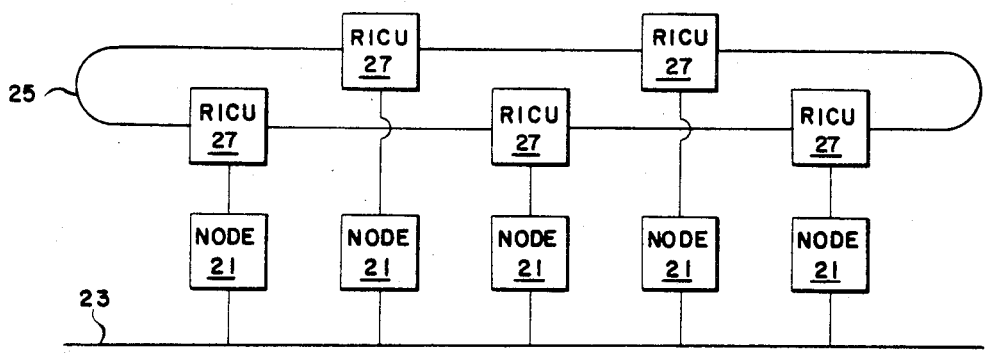
FIG. 2(b) is an illustration of a representative PBX ring network including a baseband bus local area network.

FIG. 2(b) shows a ring system of switching nodes 21 employing the services of a baseband bus Local Area Network (LAN) for the purpose of network control and internodal communications. Interface between the nodes 21 and the ring 25 is effected by Ring Interface and Control Units (RICU) 27. The embodiment illustrated incorporates an Ethernet LAN 23. Because the software is typically layered, the physical and link level protocols can be changed without affecting higher level software or system functioning. For example, the LAN 23 may be replaced by a token ring connected to each of the nodes 21.

Figure 2C:
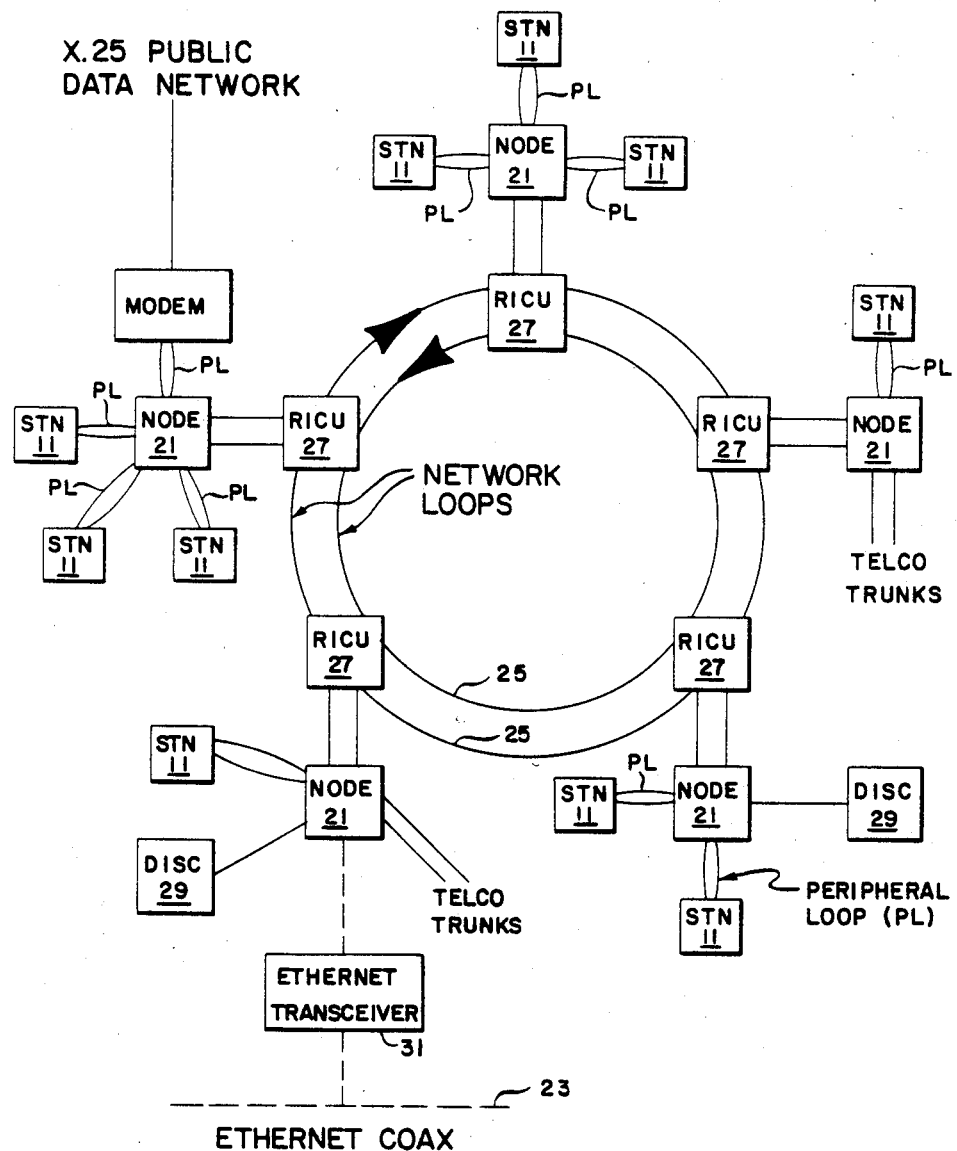
FIG. 2(c) is an illustration of a representative PBX ring network including a dual ring transmission scheme.

FIG. 2(c) is an example of a distributed switching system in acccordance with the present invention using a dual ring transmission scheme. Each of the rings 25(a) and 25(b) may incorporate integrated token ring LAN's for network control of a plurality of nodes. Consistent with FIG. 2(b), the token ring may be replaced with an Ethernet controller including Ethernet transceiver 31 connecting the LAN bus 23 to the node (shown in the dashed lines). Two identical rings 25(a) and 25(b) illustrated may each carry both a token ring and a time division multiplexed (TDM) ring that conveys the network ring signal stream. While the presently preferred embodiment of the invention employs conventional cable TV coaxial cable for the ring paths, other point-to-point transmission media of sufficient capacity could equally well be used, e.g. fiber optics or a parallel bus. Each of the nodes is connected to the pair of rings with a RICU 27.

Ring Timing

In normal operation one ring (called the forward ring) may carry circuit switched voice and data traffic in the TDM ring, and network management and control signals in the token ring. The other ring (called the backward ring) may carry digitized video channels in the TDM ring and packet switched user data in the token ring. Typically, redundant dual-ring systems will include at least two nodes equipped with disc memory subsystems 29, as indicated in the figure. The nodes 21 may also serve to link telephone company trunks and X.25 public data network, to the system as illustrated. Disc systems may be used for storage of textual data for electronic messaging applications as well as to provide two identical redundant copies of the system data base and operational software. When the system is initialized one of the two nodes having the system data base and operational software may become the network master node and will provide frame synchronization for the TDM ring. Ring mastership impacts only on the operation of the TDM circuits and not upon the token ring operation because the token ring has no master.

To operate as a PBX or voice switching system the data is transmitted around the network ring at some predetermined rate, e.g. once every 125 microseconds. That transit rate is preferably set by the master node for the entire ring. All nodes may have the circuitry needed to function as a loop master, but only one node assumes that role during normal operation. As is more clearly illustrated at FIG. 4, if the node is the master node that clocks the signal around the network ring, a switch 39 in NIM 51 is in the open position enabling a FIFO frame-buffer 35 to store the received signal until the next master frame sync signal is received. The received signal is then read from the FIFO 35 into a data steering logic 41.

The master node provides a clock signal that indicates frame synchronization every 125 microseconds and provides the bit clock for data transiting the ring. Assuming the ring is a few thousand meters in circumference, it takes only a few microseconds for data to completely transit the ring and arrive back at the master node. In order to adjust the transit time to a full frame (125 microseconds), FIFO buffer 35 may act as an elastic store. Data may be loaded into FIFO buffer 35, accumulated for a period of time (i.e., 125 microseconds minus the ring delay for the received data), and then unloaded from the buffer when the next frame synchronization signal is generated. The transit time of data to the slaved nodes around the ring is thereby adjusted to be one complete frame. The token portion of the transmission scheme does not enter into the storage time adjustment but rather is communicated to token ring logic 37. Token data passes from node to node as a series of point-to-point communication links.

Figure 3A:
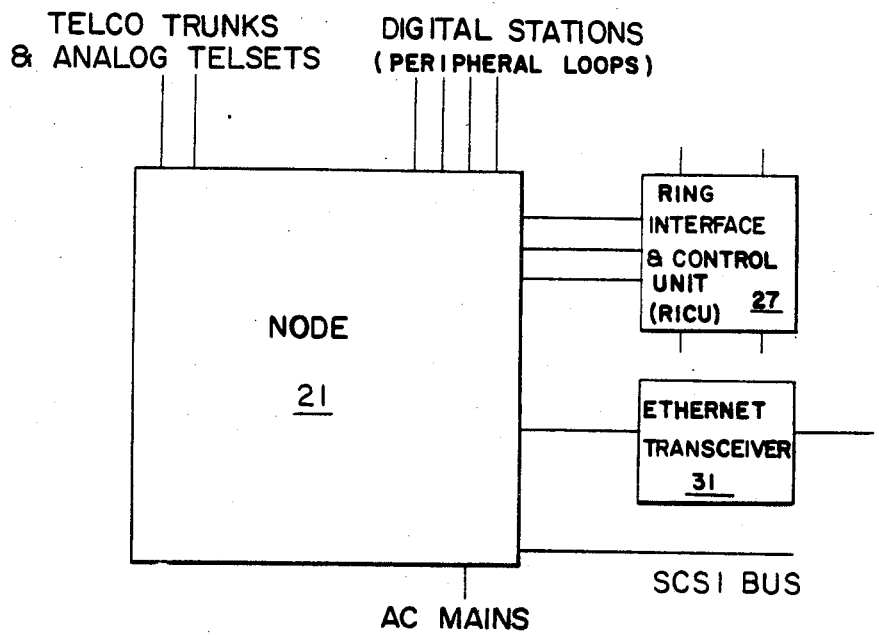
FIG. 3(a) is an external diagram of a switching node.

FIG. 3(a) is the external interface block diagram of a switching node illustrating the communication of various signals to node 21 for switching in proper sequence. As also shown in FIG. 2(c), inputs to the switching node may typically include trunk lines 54 from the public telephone company for service to network analog teleset lines, and peripheral loops 56 to proprietary digital telephone stations. The node serves to interface such traffic and the network ring 25 via the RICU 27.

An Ethernet transceiver 31 communicates signals between the node and the LAN 23 as shown in FIG. 2(c). As is more fully described below, in a multinode system the LAN is used to carry messages between nodes for the purpose of establishing time slot assignments for communicating between particular nodes and maintaining overall network control and status. In a system employing a token ring construction such messages can enter the node through the RICU 27. A small computer standard interface (SCSI) bus 58 provides an interface to a disc storage and tape storage module such as disc 29 illustrated in FIG. 2(c). The disc storage unit may be employed for text mail and messaging applications as well as for storage of the system data base and operational programs.

The data rate for the presently preferred embodiment of the ring is 49.152 Mbps for 4.096 MHz operation on the internal highways. If the internal highways operate at 8.192 MHz, the data rate on the ring is doubled. The relationship between the data rate on the ring and the data rate on the internal highways is a function of the number and speed of the TDM highways within the node and the speed of the token ring (equivalent to an integer multiple of TDM highways). Where the representative node contains 8 TDM highways and a token ring equivalent to 4 TDM highways. Thus, the ring data rate is 12×4.096 MHz or 49.152 MHz in this embodiment.

Virtually all PBX telephone equipment operates at some multiple of 8,000 samples per second. Therefore, one cycle, or frame, occurs every 125 microseconds. For telephony applications it is well known that TDM highways operate at integer multiples of 8,000 samples per second in conventional digital PBX's. Eight bits of analog voice may be taken at each sample instance resulting in 64,000 bps for each digitized voice channel.

Because of well understood technical limitations, most TDM buses are limited to between 4 and 8 MHz. The present embodiment of this invention operates at 4 MHz. However, it is understood that the broader aspects of the present invention are independent of the particular transmission rate. In one frame time a 4.096 MHz TDM highway can accommodate 64 8-bit bytes, or 512 bit time slots. In order to increase the traffic capacity of the nodes and of the network, the number of highways is set at 8 in the presently preferred embodiment, thus providing 512 8-bit time slots per frame, or 4,096 bit level time slots per frame. At 8 bits per sample, and 8,000 samples per second, information will be transferred at the rate of 64 kbps.

The majority of data communication equipment operates at speeds which are multiples of 600 bps. Because the present invention is intended to support both voice and data communications, it is necessary to find a clocking scheme which supports both multiples of 8000 Hz and multiples of 600 Hz. Simultaneous voice and data communications may be supported by choosing a clock rate for transmission between the node and telephone equipments of 192 kbps, a common multiplier of both 600 and 8,000. It is therefore possible to simultaneously provide sampling clocks for the majority of data communications requirements while providing three independent 8-bit voice communications channels. These 8-bit channels provide an aggregate throughput of 64 kbps per channel. As shown in the inset at FIG. 5 the 192 kbps rate utilized in the presently preferred embodiment is apportioned into several sections; a 64 kbps data section, a 64 kbps voice or data section, a 32 kbps overhead section, and a 32 KB signaling section. The 192 kbps rate may provide the clocking rate for all clocks necessary to interface the network ring and the data communications equipment, including the clock rate to operate teleterminal 45, which would typically operate at some multiple of 600 bps.

Figure 3B:
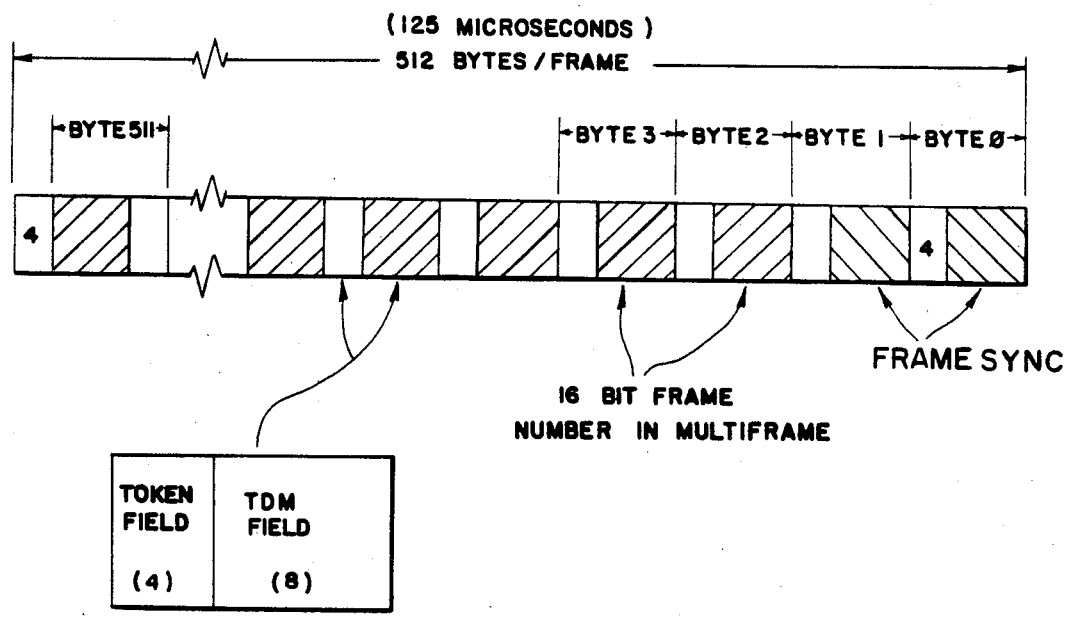
FIG. 3(b) is an illustration of an exemplary signal frame.

FIG. 3(b) illustrates a typical network ring frame format. In each 125 microsecond frame, 512 bytes of information are transmitted. Each byte is typically 12 bits and comprised of two fields, one of 8 bits, and one of 4 bits. The 8-bit field carries TDM data for the circuit switched paths. The 4-bit field is communicated to the token ring LAN as described below in connection with the embodiment illustrated at FIG. 4. Bytes 0 and 1 in the TDM field may be used for the frame synchronization pattern. A conventional correlation type circuit is used to determine frame synchronization from the bit pattern carried in these two bytes. Such conventional synchronization procedures are well known in the art and are described in numerous publications such as J. Bellamy, *Digital Telephony*, (J. Wiley and Sons 1982), the teachings of which are hereby incorporated by reference in this disclosure. Once frame synchronization is established the token field is effectively an unframed continuous bit stream whose protocol follows standards adopted by the IEEE 802 Committee. Other token ring protocols may be used equally well. The 16 Mbps token ring capacity may also be multiplexed into two or more lower rate rings.

Signal Flow Through The Node

Figure 4:
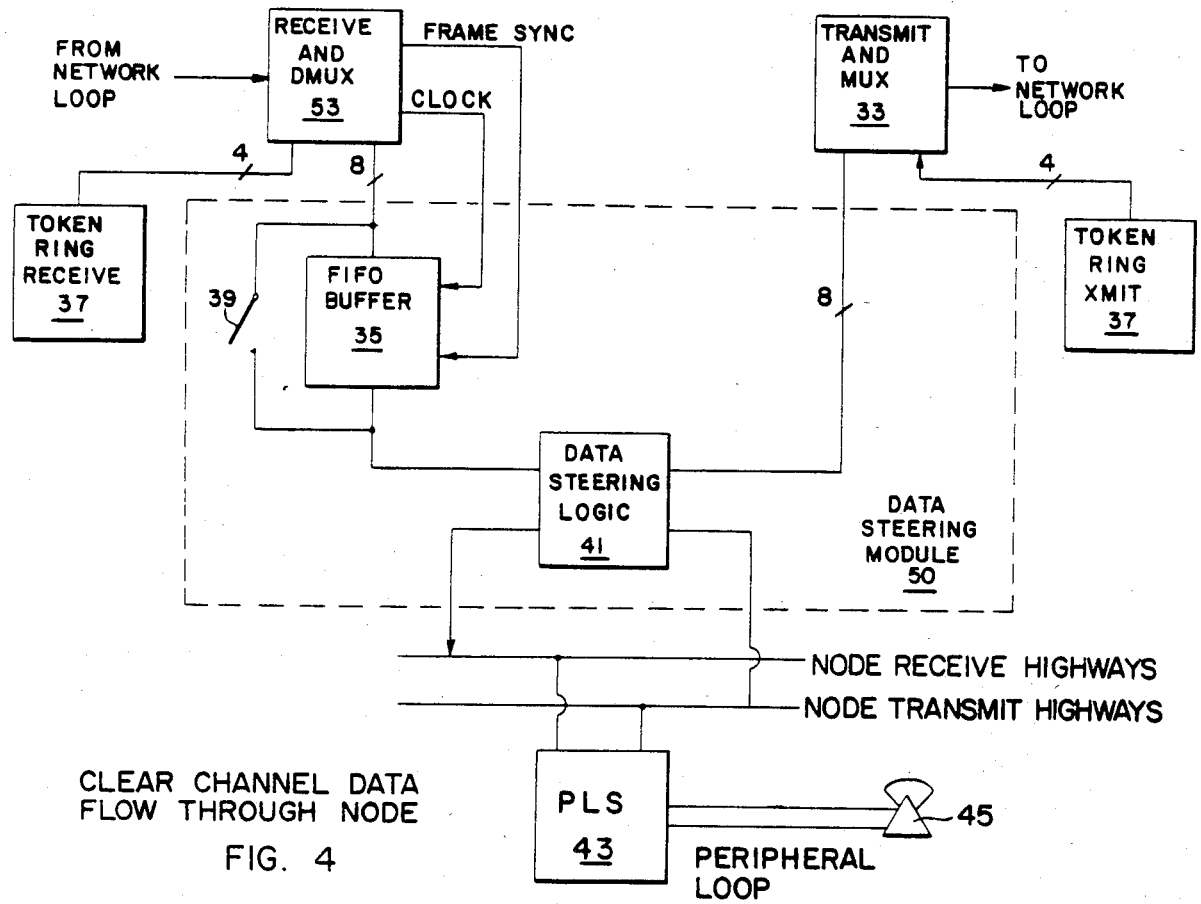
FIG. 4 is a block diagram of the network interface module (NIM) and interfacing circuitry.

FIG. 4 illustrates the flow of network ring signal traffic through the node. Details of the internal configuration of the modules used to direct the flow of traffic through the node are set forth later in the specifications following the operational description. In FIG. 4 the serial bit stream from the network ring enters a receiver and multiplexer 53 which forms a portion of the RF modem described below at FIG. 7. In multiplexer 53 the bit stream is demultiplexed onto an 8-bit bus and a 4-bit bus. The 4-bit bus is processed by a token logic 37. 8-bit TDM data is channeled onto eight independent TDM highways, labeled network receive highways 62. Each highway is steered independently by the data steering logic 41. The data steering module 50 is composed of a FIFO buffer 35, a switch 39 and data steering logic 41. As previously mentioned, in a multinode network only one node need act as a master for TDM timing purposes. The master node employs the FIFO buffer 35 to adjust the transit time of TDM data around the ring to exactly one frame time. Slave nodes, on the other hand, bypass the FIFO buffer by closing the switch 39. Whether the node is a master or a slave, the received data is passed from the output of the FIFO buffer into the data steering logic 41. The data steering logic 41 may include a bit map which depicts and controls the flow of data, bit by bit, highway by highway, from the network receive highways 62 to the node receive highways 66, and from the node transmit highways 68 to the network transmit highways 64. The contents of the bit map are established by a CPU 47 under the control of messages from the token ring. Details of the data steering logic and control mechanisms are set forth below in connection with FIG. 8.

The path of data from the network ring 25 to the peripheral loop 60 originates with data entering the receiver and multiplexer 53. In the case of a master node, the data transits the FIFO buffer 35. In a slave node the data bypasses the FIFO buffer through switch 39. Data then enters the data steering logic 41 and passes through the data steering logic to the node receive highways. After communication to the node receive highways, data then passes to the per line switch (PLS) 43 where it may be communicated via the peripheral loop 60 to exemplary local station 45. Data from the local station 45 is transmitted onto the peripheral loop 60 through the per line switch 43 to the node transmit highways 68. The node transmit highways communicate data back to the data steering logic 41. From data steering logic, data is communicated to the network transmit highways 64 and onto the network loop via the transmitter and multiplexer 33.

It should be noted that when the data steering module 70 connects the TDM highways 58 to the network ring traffic, the TDM highways conceptually form a portion of the ring network. When the signal into the data steering module is not intended to be directed to a local station the TDM ring is bypassed and the signal is transmitted back onto the network ring via transmit and multiplexer circuit 33. The TDM highways are then available for internal calls within the local ring.

Figure 5:
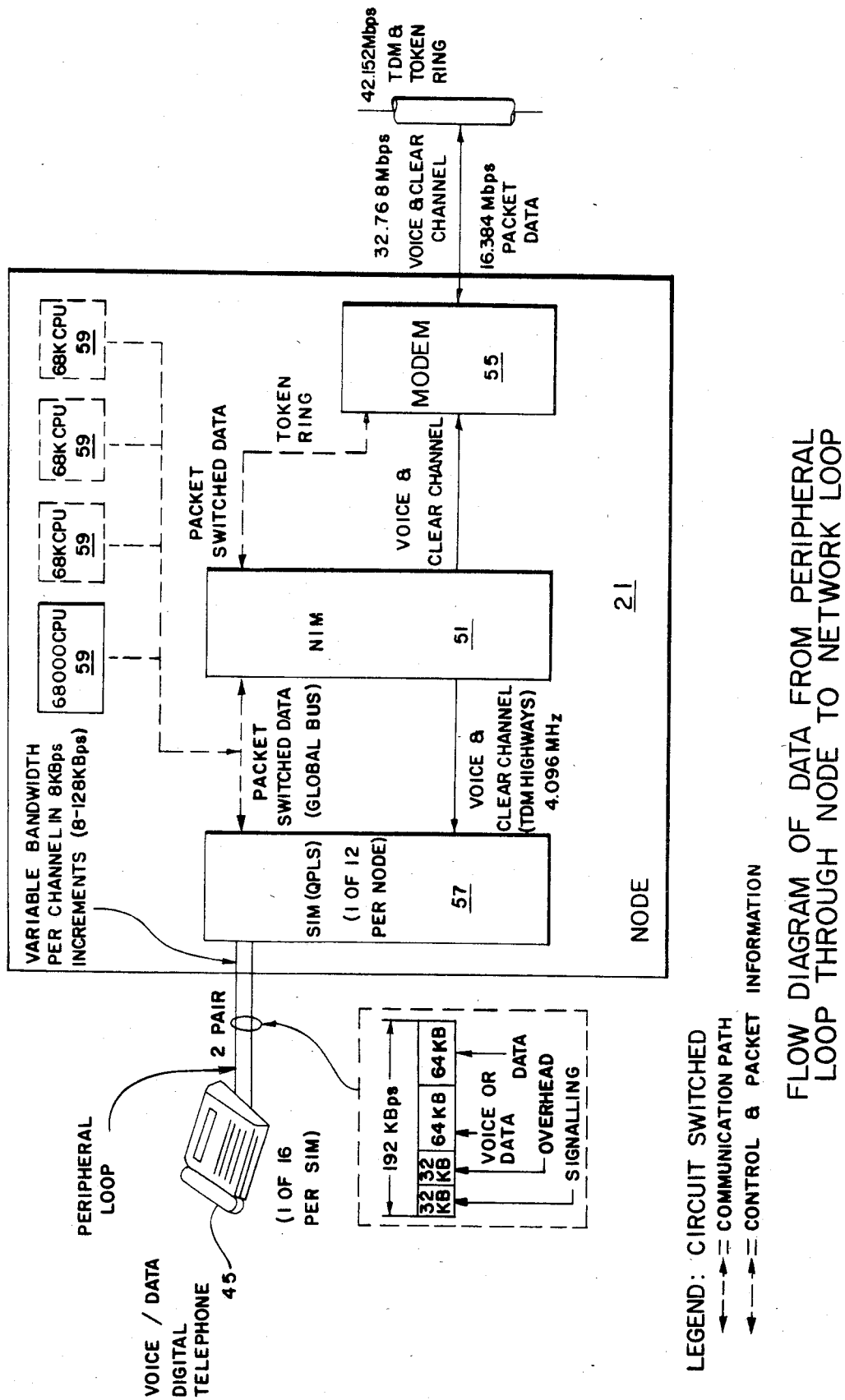
FIG. 5 is a flow diagram of the data path from a peripheral loop through a node to the network loop.

Another view of data flow in the system is seen in FIG. 5. That figure illustrates the differentiation between the flow of packet switched data and the flow of TDM circuit switched data. The token ring data may be referred to as packet data and the TDM data may be referred to as clear channel data. TDM or clear channel data enters node 21 through the modem 55. The output of modem 55 is communicated to the station interface module (SIM) 57 which contains PLS 43 (illustrated at FIG. 4), via NIM 51. In the presently preferred embodiment, the signal communicated between SIM 57 and voice data digital telephone station 45 includes 32 kbps, or four bits of packet switched data carried in the signaling channel as illustrated in the inset. Four additional bits from each frame are used for overhead. One of those four bits encodes framing information. Another bit defines active signaling, i.e. that bit indicates that the four signaling bits contain valid signaling data. A third bit encodes an underrun condition, wherein valid signaling is present but the data bits in the signaling field are fill characters that should be ignored by circuitry in the telephone 45, instead of signaling data. The last of the overhead bits is unused in the presently preferred embodiment. The remaining portion of the packet includes eight bits of data and eight bits of voice or data.

A number of applications of the packet switched data are contemplated. One application for this data is to facilitate the initialization of calls. Messages indicating telephone handset off hook, dialed digits and other button depressions are encoded and carried in the packet switched signaling channel. These signaling messages may be passed to one of the 68,000-type CPU modules 59 that execute the call processing software. In the case of a voice connection, the dialed digits may be processed by the call processing software and checked against a directory of telephone numbers active on the node. If the called number resides on this node a control message is transmitted from the 68,000-type CPU to the SIM on which the telephone resides via the transmit and receive highways for the purpose of establishing a clear channel connection to allow a conversation to take place. If the called number resides on another node a control message is transmitted from the 68,000-type CPU to the SIM on which the telephone resides via the LAN to establish a clear channel connection to allow a conversation to take place over the TDM highways.

Internal Configuration Of The Node

Figure 6B:
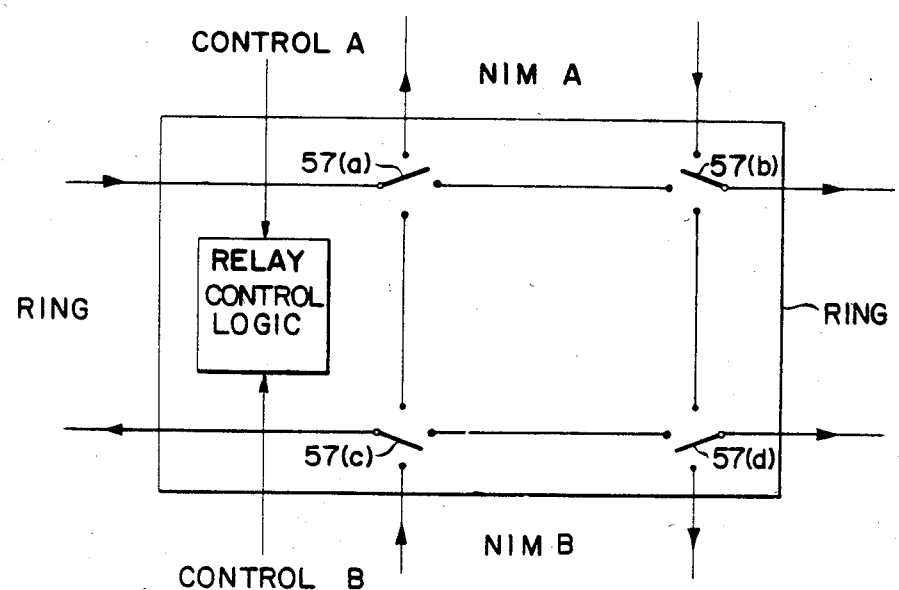
FIG. 6(b) is an illustration of the switching within a ring interface and control unit (RICU).
Figure 6A:
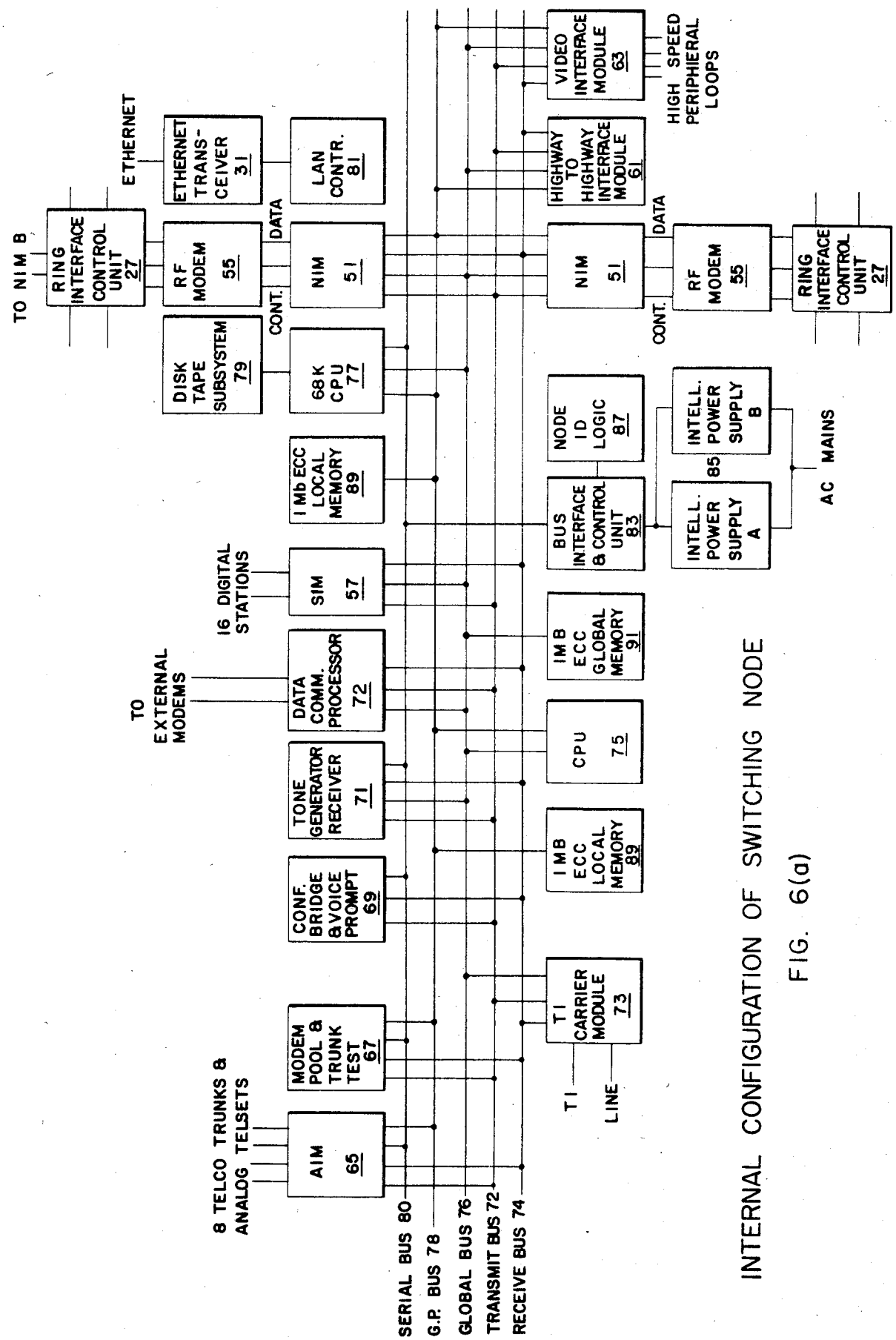
FIG. 6(a) is a block diagram of the internal configuration of a node.

FIG. 6(a) is a block diagram showing the internal configuration of a switching node. A switching node is composed of three basic classes of components: buses, plugable modules, and a power subsystem. The buses are carried on the backplane of the cabinet for the system and consist of transmit highways 72, receive highways 74, a global bus 70, a segmented general purpose bus 78 and a serial bus 80. In the presently preferred embodiment there are eight receive highways and eight transmit highways, although it is contemplated that other numbers of highways could be employed.

The global bus 76 is a computer bus with address, data and control lines. The general purpose bus serves several different functions depending on the application. In the presently preferred embodiment, the general purpose bus 78 is partitioned into four independent segments along the length of the backplane. One portion of the general purpose bus comprises a second computer bus which facilitates communication between a 68,000 CPU 75 and a local memory card 89 such that program access does not cause contention on the global bus. Another application of the general purpose bus 78 is as an alternate set of transmit and receive highways. In systems that employ fully redundant dual rings, two NIM's are utilized. One NIM communicates to the primary transmit and receive highways, and a second NIM communicates with the alternate transmit and receive highways on the general purpose bus.

Other plugable assemblies that are also served by the general purpose bus 78 include the highway-to-highway interface module (HIM) 61 which facilitates the switching of time slots from one set of highways to the other. Video interface module (VIM) 63 takes 192 kbps or 448 kbps channels from the general purpose bus and mixes a 64 kbps voice channel from the transmit and receive highways 72 and 74 to service a composite high-speed voice and data peripheral loop from SIM 57. The switching functions performed by the HIM 61 and the VIM 63 are effected by the OPLS which has the ability to switch time slots as described below.

Another application of the general purpose bus 78 is to transmit data along a number of bidirectional analog highways for communication between the analog interface module (AIM) 65 and the modem pool and trunk test module 67. Analog signals can be routed from the analog module 65 directly to an optional trunk test module (not shown) where diagnostic operations can be performed to determine the viability of the trunk circuit.

The serial bus 80 provides an economical, low speed serial communication path between various module of the system. The serial bus carries traffic logically equivalent to the traffic that is often carried on the global bus 76, i.e. command and control messages from the CPU controller to the various peripheral cards. The serial bus 80 is dedicated to command and control information of lower priority and lower traffic volume. That traffic could equally well be carried on the global bus 76. The choice is a matter of economics.

In the presently preferred embodiment the cabinet for a node has eighteen card slots for plugable modules such as the modules depicted in FIG. 6(a). Those modules include, but are not limited to, AIM 65, which provides interconnection to the telephone company trunks and to analog telesets, the modem pool and trunk test module 67 which provides low speed dial-up modems for diagnostic and test purposes as well as analog trunk test circuitry, and a conference bridge and voice prompting module 69 which performs the algebraic summation of three, four or eight voice combinations in order that voice conference calls may be established. Module 69 may also incorporate a voice synthesis capability to provide prerecorded messages and voice prompts.

The tone generator and receiver module 71 includes a number of read only memories to store the tone patterns required for normal operation of a PBX such as dial tone, ring back tone, error tone, and the DTMF tones associated with dialing.

SIM 57 may typically provide an interface to sixteen voice/data digital telephones on the peripheral loops. The SIM includes a micro computer (see module 139 at FIG. 10) that can execute programs which implement a portion of the X.3 Packet Assembly and Disassembly (PAD) function as well as control operations for establishing circuit connections.

The T-1 carrier module 73 provides an interface for North American standard 24 channel T-1 carrier service. Both common channel signaling, i.e., utilizing the services of a LAN for control signals, and in-band signaling, i.e., wherein control signals are contained in the data stream, are supported.

CPU module 75 employs a microprocessor CPU with memory protection circuitry and direct memory access. The memory cards typically accommodate 1,000,000 bytes of error correcting memory and can be configured as either local memories, e.g. 1MB ECC local memory 89, or as global memories, e.g. 1MB ECC global memory 91. As a local memory the card attaches to the general purpose bus in a segment of the backplane dedicated to processor functioning. The memory card can also function as a global memory in which case it operates on the global bus 76 and functions as a shared memory between two or more 68,000 CPU's such as CPU 77 within the node. The memory uses conventional Hamming code error correction for 2-bit error detection and 1-bit error correction. Functional specifications describing an exemplary manner of implementing the function of CPU's 75 and 77, conference bridge 69 and memories 89 and 91 are appended to this specification and form a portion of this disclosure. Each CPU module includes a small computer standard interface bus I/O port which supports multiple master CPU's and allows up to four CPU's to share a single disc system or multiple tape and disc systems 79.

As previously described, NIM 51 provides control logic and steering logic for both the LAN controller 81 and the circuit switched TDM pathways. As is more fully described below, the network ring signal stream is communicated to NIM 51 via RICU 27 and RF modem 55. A bus interface and control unit (BICU) 83 provides access to a read only memory contained in Node ID logic 87. In addition, BICU 83 provides access to the intelligent power supplies 85 which are capable, under microprocessor control, of monitoring their own voltages. The NIM 51 provides connectivity from the network loop to the internal highways and may be connected to either the normal transmit and receive highways 72 and 74 or to the auxiliary transmit and receive highways that are part of the general purpose bus 78.

Ring Interface Control

FIG. 6(b) illustrates an embodiment of the RICU 27 that serves to bypass failed nodes or to heal the ring if cable faults occur. The system operates with an active ring. In the presently preferred embodiment each ring may support a 16 Mbps token ring and a 32 Mbps synchronous TDM ring. The token rings in both active and standby rings may be used to carry data and control traffic. The active ring may be used to carry circuit switch data and voice, and the standby ring may carry digital video in the 32 Mbps TDM bandwidth. In event of a failure which necessitates switching from the active ring to the standby ring, video transmission may be sacrificed. Similarly, if broken cables occur and the ring must be healed, video may also be sacrificed. The RICU 27 may include switching devices that can bypass a failed node or connect the two rings together on either side of a node in the event of node failure or failure in the ring path, respectively. Typically, such bypass may occur on power failure of the node, failure of either the receiver or transmitter logic, or failure of critical components within the node that render it inoperative.

In the case of broken cables, the RICU 27 shown in FIG. 6(a) directs traffic on the ring to the network interface modules (NIM's) (described above) associated with each node. RICU 27 has switches 57(a-d), controlled by relay control logic 59, which make it possible to connect both rings so as to heal the defective ring. The resulting structure is topologically still a ring. However, the traffic on one of the rings is sacrificed in the healing process.

In the present embodiment, one ring, denominated the forward ring, has priority over the second ring, denominated the backward ring. If carried on the backward ring, video transmission is lost in the event of a failure. Clearly, other priorities could be applied to the healing process. If two or more breaks occur in the ring, the resulting structure may autonomously operate distributed switches. This capability affords high survivability to the switching system.

Internal Configuration of RF Modem

Figure 7:
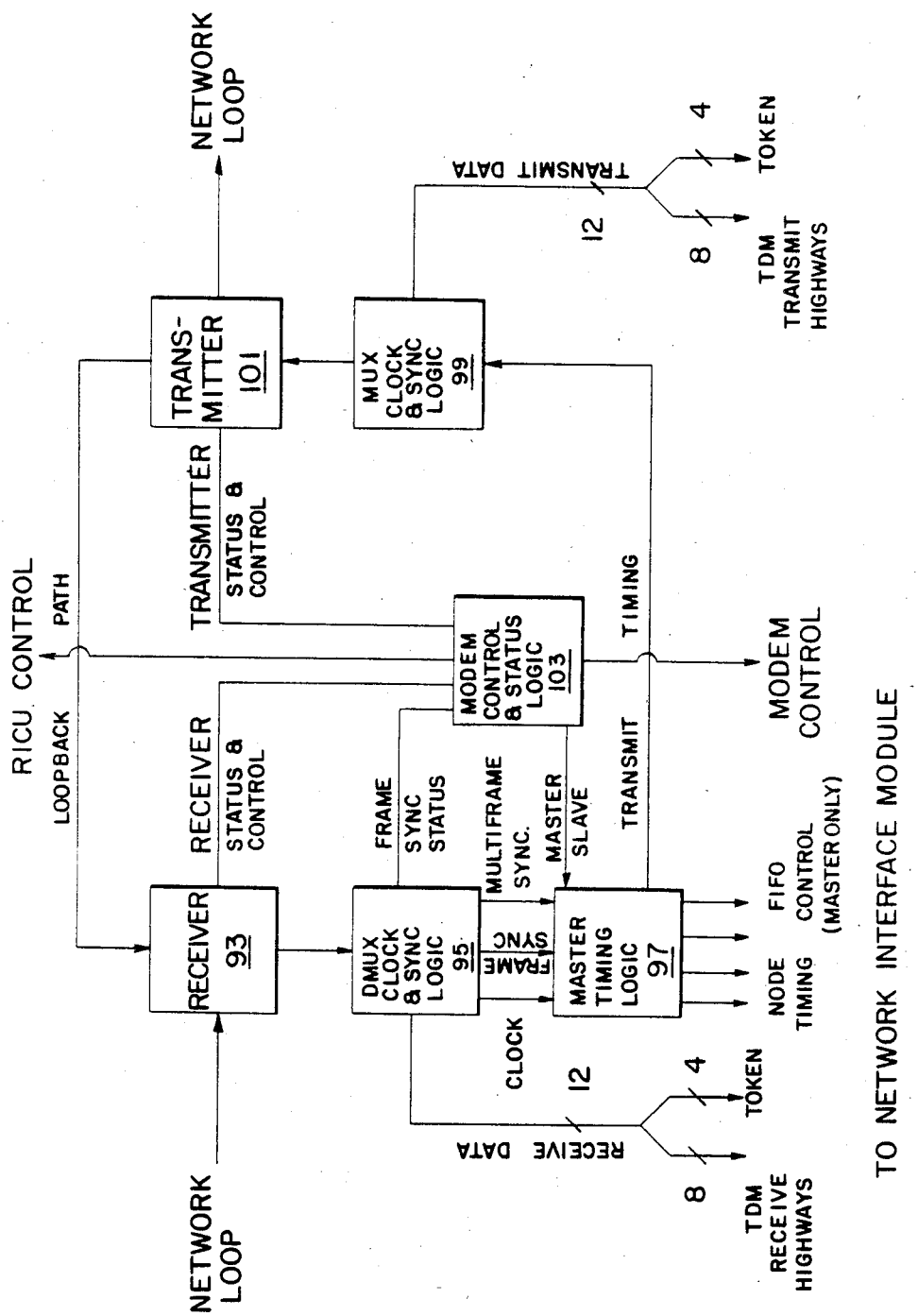
FIG. 7 is a a block diagram of an RF modem.

FIG. 7 is a block diagram of the RF modem 55 employed in the presently preferred embodiment of the invention. In this embodiment the transmitter 101 and receiver 93 employ skewed quadriphase shift keyed (SQPSK) modulation to encode and decode a bit stream of 49.152 Mbps. The information received is framed as shown in FIG. 3(b). The output of the receiver 93 is a continuous bit stream which is processed by the demultiplexer clock and frame synchronization logic 95. This logic includes correlation circuitry and a state machine which detects a frame synchronization pattern in the bit stream and allows for two consecutive erroneous frame synchronization patterns before losing frame synchronization lock. The third and fourth bytes in the TDM field contain a 16-bit code which is the frame number within a 65,536 frame multiframe. This time code allows for process synchronization among the nodes. The TDM receive data output from the demultiplexer 95 is directed onto a 8-bit parallel bus that forms the TDM highways 82 and the token ring data is directed onto a 4-bit bus that forms token highways 84. The master timing logic 97 contains an oscillator which is used by a master node to provide clock and timing for the entire network. In slave nodes, the master timing logic block, the transmit logic, and the entire node are driven from the frame sync clock and multiframe sync derived from the incoming bit stream in demultiplexer 95.

In master nodes the master timing logic 97 must provide both highway timing and transmit timing. In an independent FIFO control timing scheme, the FIFO input timing may be derived from the incoming network ring bit stream 90, though the FIFO output timing 92, node timing 94, and transmit timing 96 are generated by the master oscillator itself.

On the transmit side, multiplexer clock and sync logic 99 receives eight TDM transmit highways 86 and four token ring highways 88 as a 12-bit parallel bus. Multiplexer 99 combines the data with transmit timing information, passes the data to the transmitter module 101 where the network ring bit stream 90 is discharged. The modem control and status logic monitor 103 monitors the status of the receiver input power, bit synchronization, and frame synchronization. Both a total loss of frame synchronization and a transient frame synchronization error that does not cause a loss of frame synchronization are detected and indicated. In the present embodiment the frame synchronization logic monitors two consecutive frames for bit errors before causing a loss of frame synchronization and a search for new framing. Modem control and status logic 103 also monitors the transmitter output power.

An optional programmable loopback path is provided for diagnostic purposes. This allows the output of the transmitter to be switched to the input of the receiver. This loopback diagnostic capability disconnects the path with the network loop, and therefore is used only when a node is taken off line.

The modem control and status logic 103 also processes and passes control signals to RICU 27 for the purpose of bypassing a node or healing a broken ring as described above at FIG. 2(d).

Internal Configuration of Data Steering Logic

Figure 8:
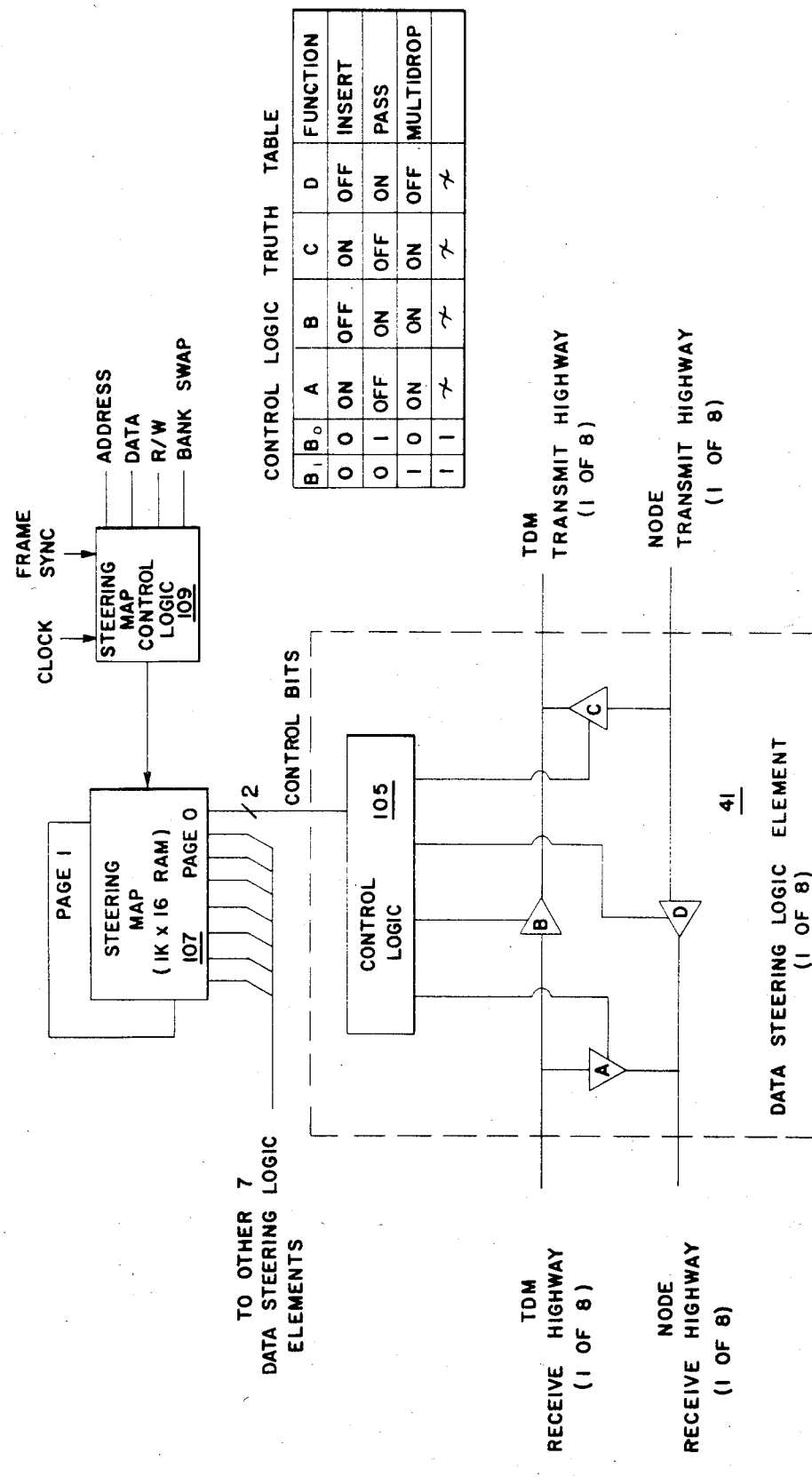
FIG. 8 is a block diagram of the data steering logic that controls switching in the data steering module.

FIG. 8 is a detailed diagram of the data steering logic portion of the NIM 51. Functional specification and programming information specifying an exemplary manner of implementing the functions of the NIM are appended to this specification and form a portion of this disclosure. In FIG. 4 above the output of the FIFO buffer 35 was shown to enter the data steering logic 41 where the data could be directed to the network transmit highways or node receive highways. FIG. 8 shows how the steering logic operates to enable the appropriate path. A data steering logic element 105, shown within the dotted line, exists for each of the eight highways in the presently preferred embodiment. The steering map 107, which is shown as external to the data steering logic 41, may be a 1K by 16 random access memory which uses two control bits for each highway. These control bits are labelled $B_0$ and $B_1$ in the control logic truth table. The output of the control logic is four signals which control the switches labelled (A), (B), (C), and (D). These switches operate as open collector logic or as tri-state logic. The truth table indicates which switches are on or off for the various modes of operation of the logic.

The steering map control logic 109 contains a 10-bit counter which is reset by the frame sync signal and incremented once for each clock pulse. The control of the steering map is effected by the steering map control logic. The output of this counter is used as the address in the steering map 107. Once each clock time, the 16-bit output of the random access memory within steering map 107 is made available to the eight data steering logic elements 105. There are two pages of memory within steering map 107: an active page and a background page. The background page is part of the memory space of the CPU 47 which controls the functions of the NIM 51 (see FIG. 4). The steering map RAM may be organized as a column of 2 bits by K for each of eight highways. Each bit pair controls a single bit on the network loop. Thus, to steer an 8-bit byte of data from the network loop into the node and from the node back onto the network loop requires writing a desired bit pattern, e.g. 00, into eight consecutive positions in memory corresponding to the time slot being addressed. Bits which are passed from the network receive highways to the network transmit highways are not made available to the internal highways of the node. For each of those bit positions, the node transmit highways are connected to the node receive highways. The data steering logic 41 forms a TDM bus for the duration of that bit interval. When a bit is to be steered into the node, switches B and D are opened and switches A and C are closed, enabling that bit to travel from the TDM receive highways to the node receive highways and from the node transmit highways to the TDM transmit highways. Thus, in a dynamic fashion the internal highways of the node change from a bus structure for internal calls to a ring structure for external calls.

Two other modes of operation exist. One mode provides the multi-drop capability for data communications. In this mode it is possible to allow multiple listeners for a single transmission or for multiple terminals to transmit to a host or terminal controller using a shared circuit. When a multi-drop is established, all participants in the network are enabled via their respective NIM's and their respective PLS'S (described below).

One embodiment of the multi-drop capability is shown in the control logic truth table wherein switches A, B, and C are on and switch D is off. This would support either half or full duplex multi-drop communication such that with switch A on, a poll message could be received by all terminals and at the same time the poll message could be propagated to the next node when the B switch is also on.

All elements of the system are typically designed such that an idling or unaddressed terminal causes the transmit highways to be in a high state. Thus, the output of switch C is typically in a high state for any inactive terminal in a multi-drop mode. In a normally operating multi-drop network only one terminal transmits at a time. Because the terminal controller is in an idle state the TDM receive highway, i.e. the output of the switch B, is high. This allows the addressed terminal to pull the junction at the output of the switch C low as required for the transmission of its messages.

The background page of the steering map memory can be read or written by the CPU 47 on NIM 51. Once the background steering map is properly loaded to contain the most recent status of all calls a bank swap command may be generated by CPU 47 which causes the active and background maps to switch roles at frame sync time. Thus, the map that was formerly in background becomes active and the formerly active map becomes the background. Additional call setups and/or knockdowns can be made in the background map after the bank switch operation has been performed.

Internal Configuration of NIM

Figure 9:
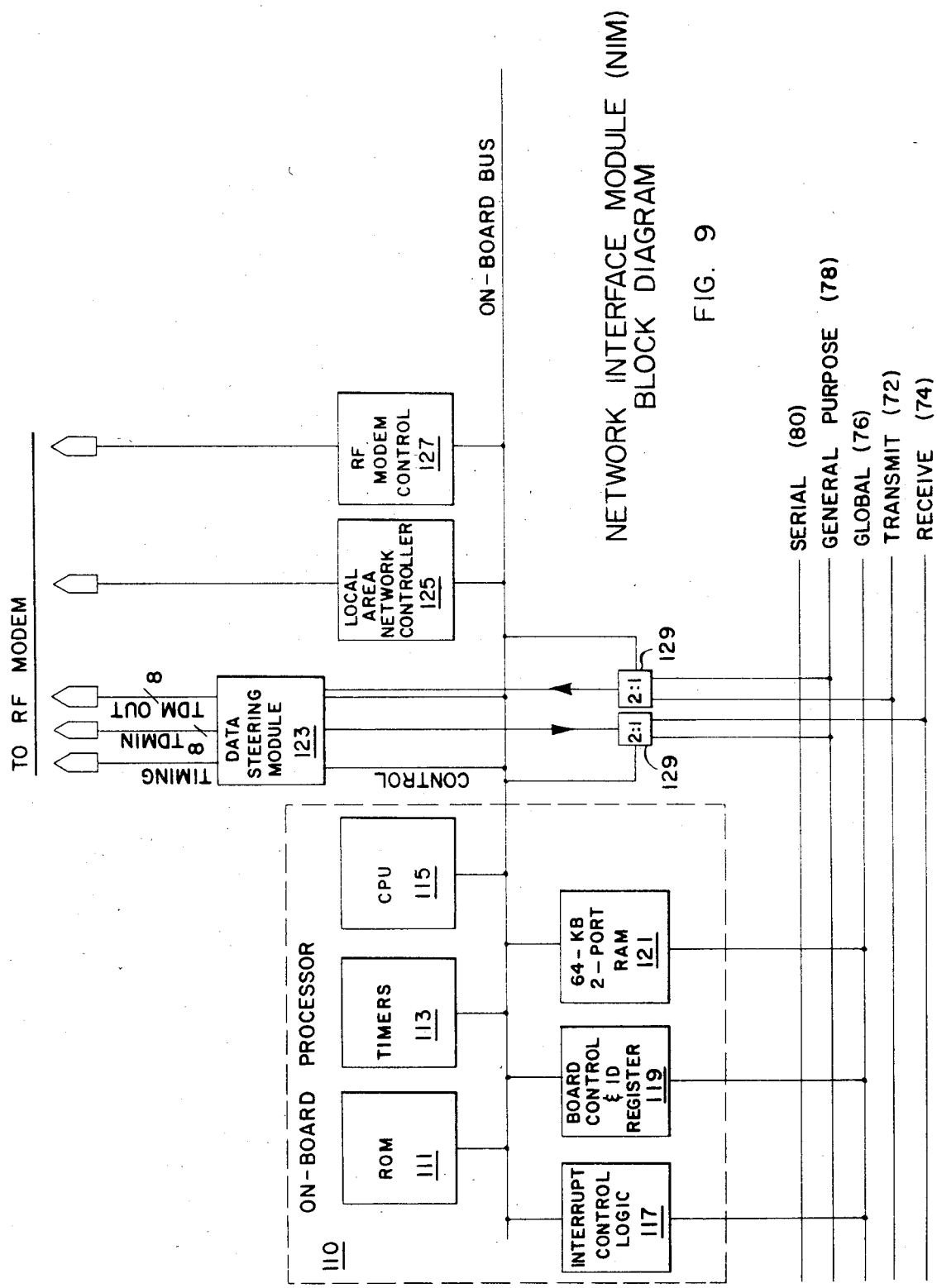
FIG. 9 is a more detailed block diagram of circuitry in the NIM.

FIG. 9 is a block diagram of a NIM 51 illustrating the relationship between the data steering module, the local area network controller and the on board processor. The details of data steering module control have previously been described. Control messages to the data steering module are provided by the CPU portion of the on board processor 110. Functional specifications describing exemplary manners of implementing the functions of the on board processor 115 are appended to this specification and form a portion of this disclosure. It should be noted that on board processor 110 is repeated in SIM 57, HIM 61, SIM 63 and AIM 65. With the exception of some functions peculiar to those modules, the processor is programmed to perform the same function in each module. The CPU 115 obtains messages from the CPU 77 (FIG. 6), and the circular buffers in the 64 kbps 2-port RAM 121 of FIG. 9. As described earlier the data steering module 123 appears as part of the memory space of the CPU 115.

The steering map of the data steering module block 107 of FIG. 8 can be conceived as having one word for each time slot on the node highways and two bit locations within each word corresponding to each of the eight highways within the node. Therefore, in order to set up a connection on the network, the CPU block 115, FIG. 9, writes into the background page of the steering map. The words correspond to the time slots to be allocated, and the bit positions correspond to the highway to be allocated. The bit values are selected from the control logic truth table on FIG. 8. The CPU causes such connections to be made on demand of the CPU 77, FIG. 6. CPU 77 writes control messages into circular buffers contained in the 64 kbps 2-port RAM 121, FIG. 9. The CPU 115 controls the operation of the entire NIM. When the NIM is powered on for the first time an initialization program is executed from read only memory 111. At that time complete diagnostics are also executed, and if the board is functional a code so indicating is written into the Board Control and ID Register 119. At that time, CPU 115 goes into a state awaiting acknowledgment from the CPU 77, FIG. 6. CPU 77 writes a code into the board control and ID register 119 via on board bus 102, which enables CPU 115 to read and write the transmit and receive TDM buses 22 and 74, enables the interrupt logic, and enables the 64 kbps 2-port RAM onto the global bus 76. The operational code modules for CPU 115 are loaded into the 64 Kpbs 2-port RAM 121 by the CPU 77, FIG. 6(a). CPU 115 then executes its code from 2-port RAM 121. The 2-port RAM 121 also contains a number of circular buffers for communication between CPU 115 and CPU 77.

The NIM is event driven, wherein events are signals initiated by devices attached to the peripheral loops via the SIM 57, the AIM 65, the VIM 63, or the T-1 carrier module 73. 2-port RAM 121 is part of the memory space of CPU 77 and is accessed via the global bus 78. Internodal message traffic is handled with the LAN controller 125. If a node has traffic for another node, that message is typically generated and formatted by the CPU 77 and written into a circular buffer in 2-port RAM 121. Then CPU 115 processes the message, adding the necessary protocol information and passes the message to the LAN controller 125 for transmission to the distant node. Similarly, traffic coming from a distant node via the LAN will be arriving at the LAN controller 125 and will be processed by the CPU 115, which removes the necessary protocol information and passes the message to the CPU 77 via a circular buffer and 2-port RAM 121.

Thus, if the message traffic from a distant node were a request to establish a circuit, that message would arrive in the LAN controller 125 and protocol handling would be accomplished by CPU 115. The message would then be written into circular buffer and 2-port RAM 121. The circuit request would be processed in the CPU 77, and the final request for circuit establishment would be generated by CPU 77 via a message written into a circular buffer in 2-port RAM 121. That message would then be processed by CPU 115. In a manner earlier described, the CPU 115 would load the data steering module 123 to set up calls.

When messages are written into the 2-port RAM 121 by either CPU 115 or CPU 77, the interrupt control logic 117 is employed. Messages emanating from the NIM cause interrupts to be generated for the CPU 77. Messages from the CPU 77 to the NIM cause interrupts of the processor 115 via the interrupt control logic 117.

Except for dynamically enabling the connection of transmit highways to receive highways, the NIM assembly is not involved in calls within a node, but it is involved in all calls between nodes. The RF modem control logic 127 is used to communicate with the RF modem for diagnostic and control purposes and for control of the RICU 27, which is a peripheral of the RF modem. The two-to-one multiplexers 129 are used to select between the normal transmit and receive highways and an alternate set of transmit and receive highways which may form a part of the general purpose bus. In redundant systems, which use two NIM's, one NIM is set up to communicate with the normal transmit and receive highways and the second NIM is set up to communicate with the alternate set of transmit and receive highways. Messages for directing such setups to occur are passed to the NIM via circular buffers and the 2-port RAM 121.

Timers 113 serve two functions. Timers 113 include a watchdog timer that must be reset by the CPU 115 periodically in order to indicate proper functioning of the CPU and its associated programs. If a failure occurs which results in the inability of the CPU 115 to reset the watchdog timer portion of timer 113, that portion will activate the reset line to the CPU which will terminate its operation and cause the board control and ID register 119 to indicate that the board is inoperative. Other timers included in 113 provide timing for measuring intervals between various events of significance involved in the handling of communications protocols between nodes.

Internal Configuration of SIM

Figure 10:
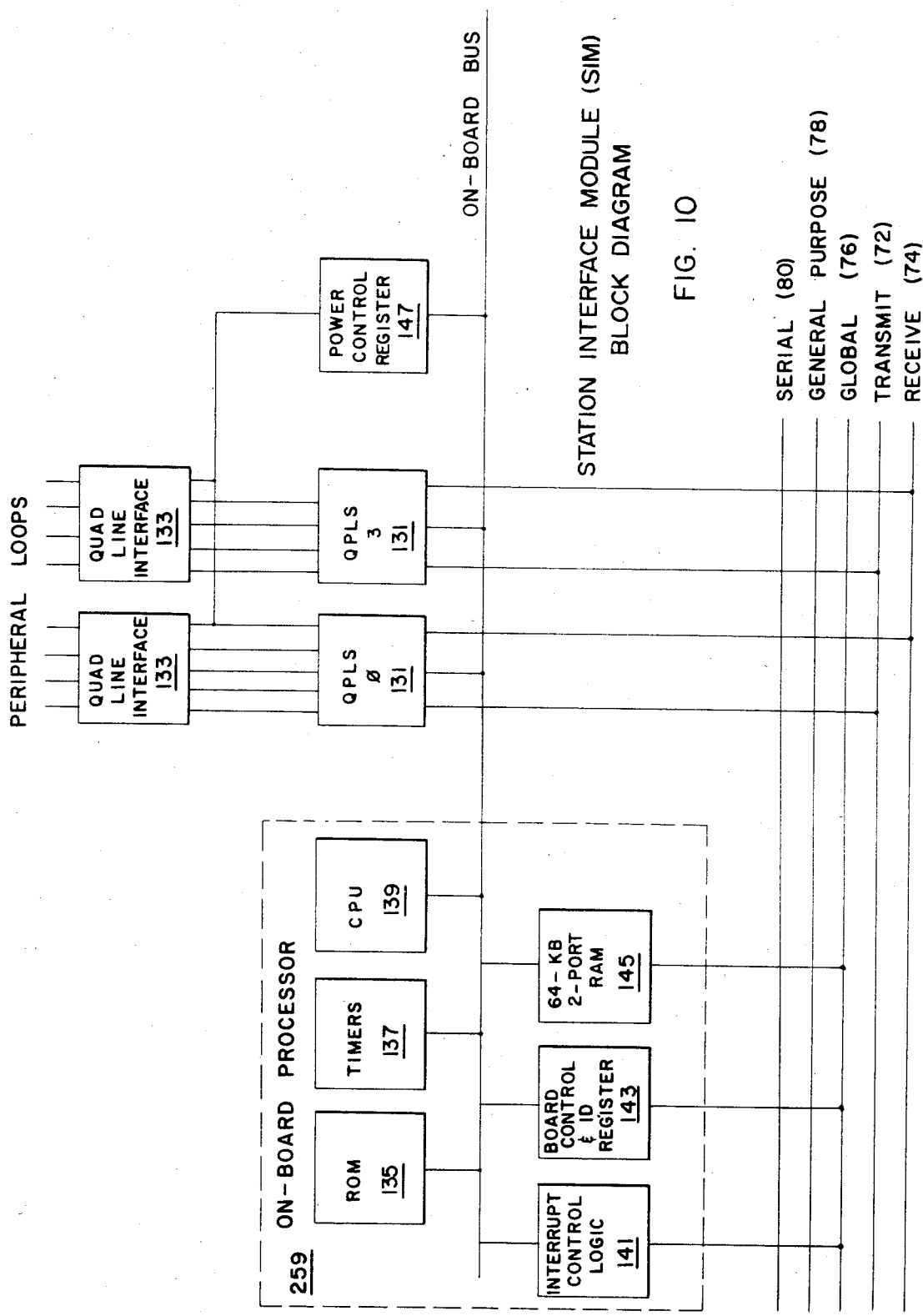
FIG. 10 is a block diagram of the station interface module (SIM).

FIG. 10 is a block diagram of the station interface module (SIM). Functional specifications and programming information specifying an exemplary manner of implementing the functions of the SIM are appended to this specification and form a portion of this disclosure. The processor portion of the SIM is identical to the NIM and all messaging and control between the SIM and CPU 77 follows the same procedures described in the NIM. The entire system described in this invention is event driven where events occur asynchronously (initiated by the various assemblies that interface to human users or to intelligent peripherals such as computers) or synchronously (initiated by various process controls, building management, or similar devices). The SIM serves as an interface to the digital station equipment attached to the peripheral loops 104. A user of a digital teleset can initiate events by pressing buttons on the telephone, by lifting the handset, or by toggling the various modem control lines on the data interface portion of the station. Such an event causes a signal to be transmitted from the telephone to the SIM via the wires of the peripheral loop. These two pairs of wires typically carry DC power for the digital telephone. One pair is used to transmit to the telephone while the other pair is used to receive messages from the telephone. Quad line interface 133 interfaces the peripheral loops to the I/O ports of the quad per line switch (QPLS) 131.

It is common practice to equip a node with more peripheral loops than are actually in use. The teleset power control register (TPCR) 147 is used to selectively control the power transmission to the telephones (e.g., 16 stations) supported by the SIM. That is, any telephone can be turned on or off by setting the appropriate bit in the power control register 147. PCR 147 thus permits powering down selective peripheral loops as may be desired for various reasons, e.g. to prevent their unauthorized use, or to reduce power consumption in order to accommodate battery operation of the node in the event of a power failure.

Messages generated by stations on the peripheral loops are received by the quad per line switch 131, which passes the messages to the CPU 139 in on board processor 259. When a valid signaling message is received the CPU either takes immediate action or passes the message or interpretation of the message to the CPU 77 via a circular buffer in 2-port RAM 145. Messages from stations requiring immediate feedback include tone feedback to indicate valid depression of buttons and other character echoing functions for data applications. After a telephone number is dialed, the message indicating that a connection is to be established is generated by the CPU 77 and sent to the CPU 139 via a circular buffer of the 2-port RAM 145. The CPU 139 then processes the message and causes one per line switch of the four within QPLS 131 to be programmed for use of the particular time slot or time slots. Intra-node connections typically require independent receive and transmit time slots, though network connections may require only a single time slot.

Figure 11A:
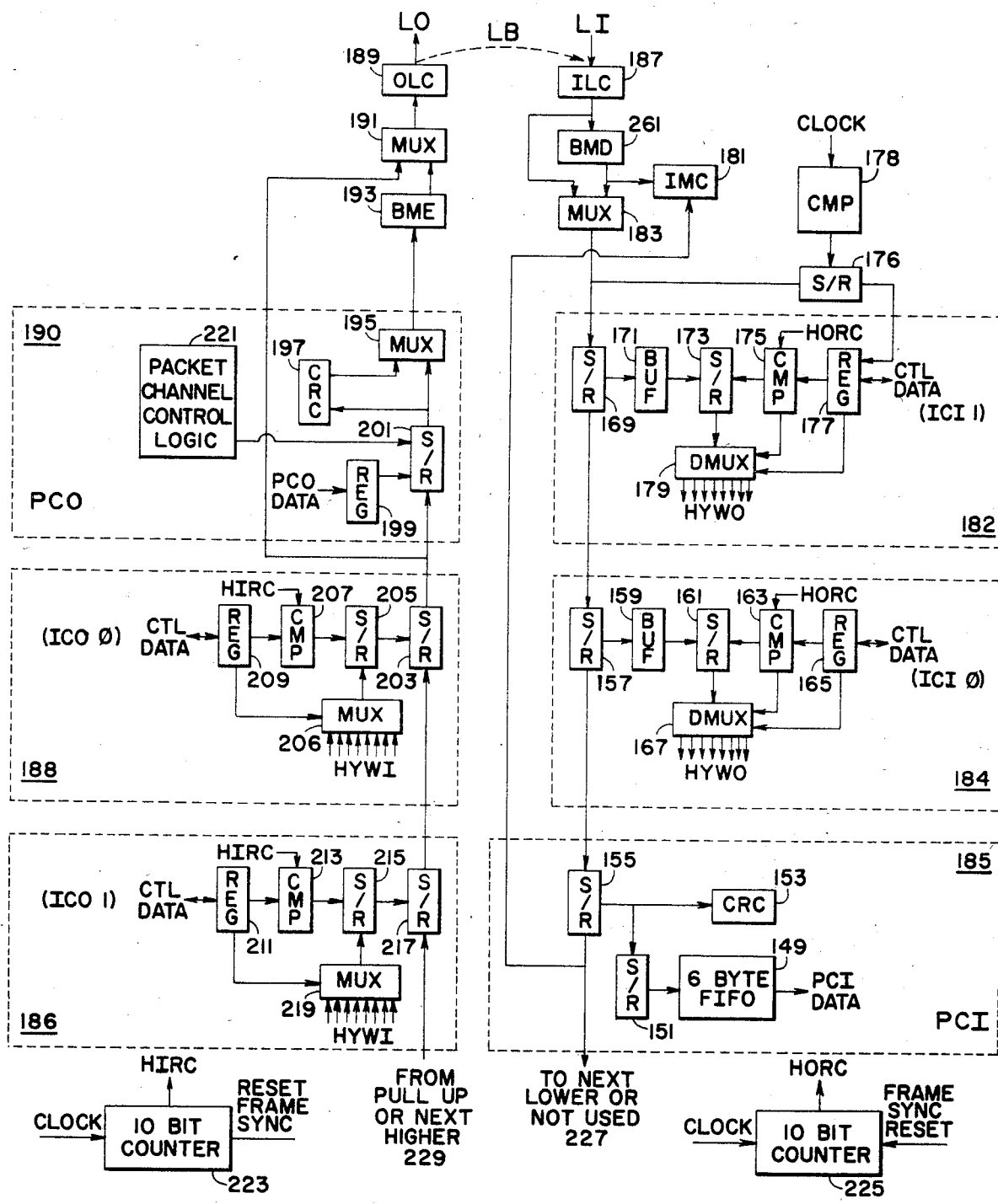
FIG. 11(a) is a block diagram of a per-line-switch (PLS).

The QPLS 131 consists of four independent devices each called a per line switch. Each per line switch has the capability to independently enable two transmit time slots and two receive time slots where each time slot can be 1, 2, 4, or 8 bits and may start any number of bit times after frame synchronization. The QPLS may include a 6-byte FIFO for buffering incoming control messages from the stations. FIG. 11(a) is a block diagram of a single exemplary per line switch (PLS) 43. Each per line switch may include four independent time slot assignment circuits. In the embodiment shown, there is a time slot counter for transmit and another for receive. Those 10-bit counters may be reset at frame synchronization time and clocked by the time division multiplex highway clock at 4.096 MHz or 1.92 MHz. An alternate embodiment may have a single time slot assignment circuit for each channel and a one bit register for each of the transmit and receive circuits. This register indicates the directionality of the "transmit" and "receive" highways. That is, in this embodiment, for internal connections, a two party call uses only one time slot with one PLS operating in the normal mode (transmits on the transmit bus, receives on the receive bus) and the other PLS operating in reverse mode (receives on the transmit bus and transmits on the receive bus).

PLS control registers are viewed as memory locations by the CPU 139 (FIG. 10). Control registers 209, 211, 177, and 165 contain the time slot number which identifies the first bit location of a multi-bit time slot. Thus, to enable a time slot beginning, for example, in bit location 203, the number 203 is written by the CPU 139 into the appropriate register, such as register 209 in ICO∅ circuitry 188. This register contains a time-slot field, a bit-control field, and a highway-select field. When the output of the 10 bit HIRC time slot counter 223 equals 203 the comparator 207 causes the selected number of bits to be shifted from the selected highway into shift register 205. Three bits of register 209 are used to select one of eight highways. At frame synchronization time, the contents of register 205 are parallel transferred in shift register 203. The operation of ICO1 circuitry 186, including register 211, comparator 213, and shift registers 215 and 217 is similar to ICO∅ operation.

Data coming from a teleset to be written onto a highway operates in a manner similar to that described above. The time slot number of the beginning bit location is written into the appropriate register, i.e. register 177 or 165. When the output of 10 bit HORC time slot counter 225 is equal to the specified value, comparator 175 or 163 causes the appropriate number of bits to be shifted from shift register 173 or 161 onto the highway. Typically, the content of all registers includes a 10-bit field for time slot number. That field extends for 1024 bit times per frame, allowing the PLS to operate at 8.192 Mbps per second. A 3-bit field selects the appropriate highway and a 2-bit field selects the length of the message: 1, 2, 4, or 8 bits. Thus, each of the registers 209, 211, 165, and 167 is treated as a 15 bit memory location in the memory space of CPU 139.

To program a time slot for internode calls or connections, CPU 139 (FIG. 10) writes a 15-bit word into two registers, such as transmit register 165 and receive register 209. Both the transmit and receive registers contain identical 15-bit words. That is, the highway, the time slot, and the message length are identical. For intranode calls the transmit and receive time slots may be different, and there is no requirement that the time slots be on the same highway. Thus, the two words can be entirely different. CPU 139 writes the control words to the appropriate register and this immediately activates the appropriate time slots. When the contents of the register correspond to the 10-bit counter HIRC or HORC the comparator causes the appropriate number of bits to be shifted to or from the addressed highway.

In the presently preferred embodiment, there is no difference between the two data channels for transmit and the two channels for receive. It is possible, however, to treat the PLS as having two independently programmable data channels or two independently programmable voice channels or a voice and a data channel. It is the variable bandwidth nature of this element that is in part responsible for the variable bandwidth switching capability of the entire system. Because 1, 2, 4, or 8 bits at a time can be written onto the highways labeled HYWO, it is possible for the data steering logic to then read that number of bits and transmit them via the ring to another node. Likewise, it is the data steering logic's capability to write any number of bits onto the highways HYWI that allows the bandwidth of the other half of the conversation to vary.

Typically the contents of a register pair, i.e. transmit and receive registers, do not change once they are programmed for the entire duration of the session or the call that has been established. However, data from CPU 139 to the transmit or receive registers, corresponding to the bit space allocation assigned to a particular station, may be updated to accommodate changing requirements at the station, e.g. turning on data equipment. For example, initial turn on of data equipment may generate a signal pattern which may be communicated to and be recognizable by shift register 176. When that signal pattern appears in register 176, comparator 178 may enable a signal path which may be communicated to an adder 180, where it can be added with the data from CPU 139 and then communicated to a programmable register 177 which may offset the data signal from CPU 139, so as to set register 177 in a configuration for bit allocation that is different from that indicated by CPU 139. Shift register 176 may generate different offset signals to adder 180, depending upon the activity at the local station as indicated by the preset signal patterns received at shift register 176. Alternatively, a start-up signal indicating a change in status at the local station, may be directly communicated to shift register 176 or the like, without encoding of the start-up signal into the data signal stream from the local station. The above-described technique thus provides the system with a further dynamic capacity not only to vary the bit space allocation in accordance with the particular station addressed, but also in accordance with the current requirements of that station, thereby making the most efficient use of the network signal stream. This capacity may be alternatively provided by utilization of memory updating circuitry at CPU 139 (e.g. similar to the update capacity of the data steering logic). Update signals may be provided to CPU 139 by event driven switching within the teleset microprocessor, which may monitor the level of activity at the local station, or by a separate switching circuitry at the teleset. The update signal may be communicated to CPU 139 via an available signal path to the SIM, or encoded as a recognizable bit pattern into the signal stream from the teleset.

Another alternate embodiment eliminates the capacity to vary the bits per message field as programmed into the registers 209 and 211, and always shifts out 8 bits from the receive highways. In such a configuration the sole responsibility of the microtelephone controller (described later) is to demultiplex the signal to use just the first n bits of the byte. This embodiment facilitates expansion of the bits-per-frame field to allow 1, 2, 3, 4, 5, 6, 7, or 8 bits.

A loopback capability (shown by dashed lines LB in FIG. 11(a)) permits the line output (LO) to be electrically connected to the line input (LI). The functional specifications of the QPLS, appended to this application, describe an exemplary manner of implementing that loopback capacity. In the loopback mode all the traffic that would have gone out to the station is looped back and is received by the input line control circuitry (ILC) 187. This loopback capability finds utilization in diagnostic applications as well as for highway-to-highway switching. The two time slot counters HIRC 223 and HORC 225 have independent clock and frame synchronization lines. Thus, in the loopback mode it is possible for the PLS to act as a highway-to-highway switch where it picks up one or two time slots from the receive highways and puts them on different time slots on the transmit highways. In this mode of operation the phase relationships of the two highways need not be identical. The kbps output packet channel 190 is included in the bit stream with logic indicated by 199 and 201. Input packet channel 185 includes logic 149, 151, 153 and 155.

In the alternate embodiment previously described, which includes a single time slot assignment circuit for each channel, the highway-to-highway switching mode is not supported. Such highway-to-highway switching utilized two time slot assignment circuits to enable a time slot to be taken from a arbitrary time slot on one highway and written onto any other time slot on a different highway.

In order to transmit a message to a digital telephone, a byte is written into a register 199 and parallel transferred four bits at a time into shift register 201. The overhead bits, including framing, fill, and packet channel activity are also added to the 8-bit shift register 201 by packet channel control Logic 221, and the entire 24-bit packet to the telephone is shifted out from shift registers 201, 203 and 217. In normal operation the data from these three shift registers is clocked at 192 kbps. The packet channel bits are diverted through the CRC generator logic 197 and multiplexed back into the bit stream. All other bits are shifted directly out of the PLS through the multiplexer 195. The data stream is then biphase marked, coded with the logic in 193, through multiplexer 191 to the output line control logic 189, and then passes to the output pin of the PLS.

Referencing FIG. 11(a), the data stream coming in from the station passes through the input line control logic (ILC) 187 through the biphase mark decoder 185. Data is then communicated to multiplexer 183 and into the shift register stream to shift registers 169, 157, and 155. After an entire frame has been shifted into the shift registers, all twenty-four bits are then in storage in the three shift registers. At that time the circuit switched channels are parallel transferred from shift registers 157 and 169 to buffers 171 and 159. In the next frame the data is transferred from the buffers 171 and 159 to shift registers 173 and 161. Data stored in shift registers 161 and 173 is shifted out onto the appropriate highway as selected by the 3-bit highway select field in the registers 161 and 173. The number of bits to be shifted out is determined by the 2-bit message length field in the same registers, as described above.

The input packet channel field is shifted through the cyclic redundancy check logic (CRC) generator 153 only during periods when the packet channel active bit is on. CRC 153 checks an active packet channel transmission for CRC accuracy. As each 8-bit byte of data is accumulated in shift register 151 it is stored in a 6-byte FIFO 149. When any data is in this FIFO a status bit becomes true and the data becomes accessible as a memory location to the CPU 139 on the SIM.

Figure 11B:
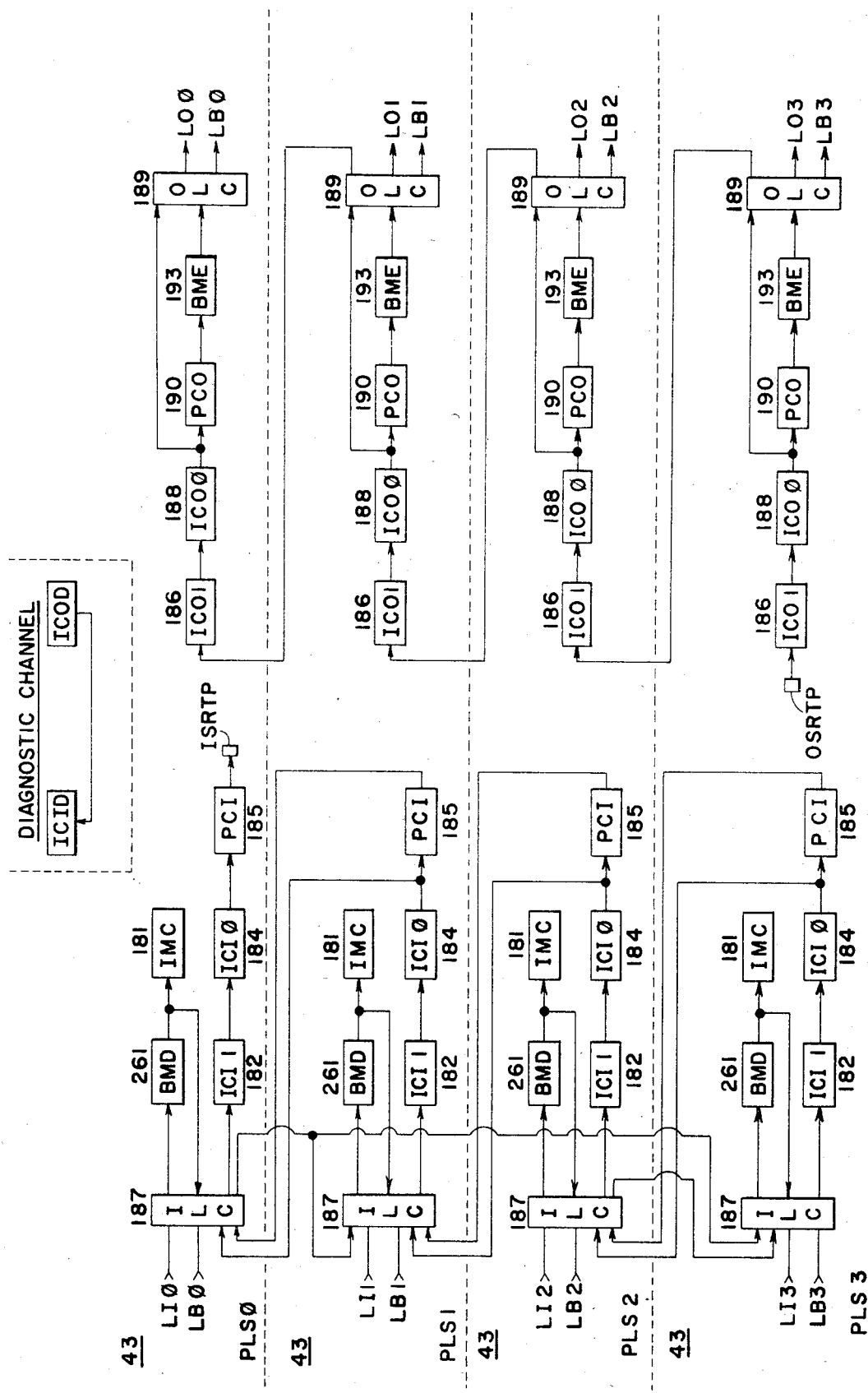
FIG. 11(b) is a block diagram of a multiple PLS configuration.

As illustrated in FIG. 11(b), the QPLS 131 is an integrated circuit that contains four individual per line switches 43. In order to more readily describe the various modes of operation of the QPLS, reference is made to the circuits depicted in more detail in FIG. 11(a). FIG. 11(b) shows how the four PLS elements within the QPLS are interconnected to enable several different modes of operation.

A number of different operational modes exists for the PLS, including elimination of the packet channel operation. When packet channel operation is eliminated, the output of ICO∅ 188 (i.e. the output of shift register 203) is diverted around the packet channel logic and forwarded to output line control logic (OLC) 189 for transmission off chip. This configuration of the PLS is used for switching and multiplexing applications on the PC circuit board assembly such as those associated with the analog interface module or the conference bridge. Functional specifications and programming information specifying an exemplary manner of implementing the functions of the analog interface module are appended to this specification and form a portion of this disclosure. Functional specifications relating to the conference bridge are also appended to this specification, and form another portion of this disclosure.

In the standard 4-channel mode of operation all four PLS elements operate independently as described earlier in connection with FIG. 11(a). The QPLS may also operate as a 2-channel device wherein each channel operates at twice the normal speed, or as a single channel device wherein one channel operates at four times the standard rate, thereby allowing two or four times the data rate on the peripheral loop. As described above, it is possible to bypass the packet channel circuitry so that in the double and quad speed options the output data includes only the circuit switched information, the packet switched information being eliminated. That mode of operation typically is employed when the integrated circuit is used for switching and multiplexing applications on a circuit board assembly.

By way of example, when the QPLS operates at quad speed mode, with the packet channel circuitry not bypassed, the peripheral loop is attached to the line input 3 (LI3) on line input control module 187. In one frame time (125 microseconds), four 3-byte packets, as described in connection with FIG. 5, are received and stored in the shift registers ICI0 184 and ICI1 182 and PCI 185 within PLS 3, PLS 2, PLS 1, and PLS 0. As described in connection with FIG. 11(a), the shift registers 155, 157 and 169 that are within PCI 185, ICI∅ 184 and ICI1, respectively, form a full-frame buffer for the PSL 43 during the entire message. At the end of the frame the four PLS's operate in the manner described for a single PLS in reference to FIG. 11(a). The shift register data are parallel transferred from blocks 169 and 157 into buffers 171, 159, as previously described.

In a similar manner, in a single frame time, eight bytes of data are taken from the receive highways 4 by ICO1 and ICO0 in each of the four PLS's. These bytes may be 1, 2, 4, or 8 bits in length as may be allocated by the data steering module, described above. In the case of shorter messages, the valid data are indicated and transmitted first. Fill bits of all ones are transmitted thereafter. Thus, in a single frame time, eight bytes of data are stored in the shift registers in ICO0 and ICO1 for each of the four PLS's.

In the next frame time, the eight shift registers may be connected end-to-end so that they may be shifted out in series to a high-speed device on the peripheral loop attached to LO 3 on block 189. In the high-speed mode, the input and output for the QPLS are applied to LI0 and LO0. For double speed mode the inputs are applied to LI0 and LI2, with the outputs applied to LO0 and LO2. High-speed modes of operation permit compatibility with peripherals that operate at 384 kbps or at 768 kbps. At 384 kbps a station may support 192 kbps of data, 64 kbps of digitized voice and 32 kbps packet channel. In the high-speed, 768 kbps mode, a channel may accommodate 448 kbps of high-speed video data, 64 kbps of digitized voice and up to four packet channels of 32 kbps each.

Each QPLS may also include an optional diagnostic channel that is functionally like other PLS channels but has no input or output to a station loop. The diagnostic channel functions only in the highway-to-highway mode and allows highway-to-highway switching for the purpose of diagnostic test operations.

FIG. 12(a) is a block diagram of the micro telephone controller (HTC) 229. Functional specifications and programming information specifying an exemplary manner of implementing the functions of the MTC are appended to this specification and form a portion of this disclosure. The PLS described earlier encodes the data with a form of manchester encoding called biphase mark encoding. As described in connection with FIG. 13, below, a 768 kHz clock is extracted from the manchester encoded data stream with a phase lock loop. This clock is applied to the MTC 229 as shown in FIG. 12(a). The manchester encoded data is applied to the frame synchronization logic 200 with the 768 kHz clock (S clock). Frame synchronization logic removes the clock information from the manchester data, producing a data stream denominated as NRZ data. The NRZ data is applied to packet channel logic 204 which determines the frame boundary by observing the frame synchronization bit of each frame. Once frame synchronization is established, frame synchronization logic 200 demultiplexes the frames by creating three enable signals: channel zero enable, channel 1 enable, and packet channel enable. During each frame time the enable signals come true during the appropriate intervals allowing the appropriate NRZ data bits to be clocked into the channel zero logic 202, channel one logic 206, and packet channel logic 204. For example, NRZ data and packet channel enable may be applied to packet channel logic 204 causing four bits of packet channel data to be clocked into the packet logic channel during each frame interval. In a like manner, NRZ data and channel 1 enable are applied to channel one logic 206 causing 1, 2, 4 or 8 bits to be clocked into the data communications logic during each frame interval. Channel zero enable may also be applied to channel one logic 206 to provide a high speed mode of operation in which all 16 bits of clear channel information are clocked into channel one logic 206 during each frame interval. Such a configuration produces a composite data rate of 128,000 kbps. During each frame interval 8 bits of NRZ data are clocked into channel zero logic 202 and directed to the transmit frame assembly 210. Similarly, the encoded data communications bits from channel one logic 206 and the data and overhead bits from the packet channel logic 204 are applied to the transmit frame assembly 210. This information allows transmit frame assembly 210 to assemble a 24-bit frame once each 125 micro seconds.

The packet channel logic 204 computes a cyclic redundancy check (CRC) character of 16 bits during intervals when the packet channel enable bit is true. A CRC is computed and appended to the transmitted data stream after the last byte of data is sent to packet channel logic 204 from the CPU control port 205. When packet channel data are being transmitted by packet channel logic 204, 8-bit bytes of data are broken into two 4-bit nibbles with one nibble transmitted during each frame.

Figure 12B:
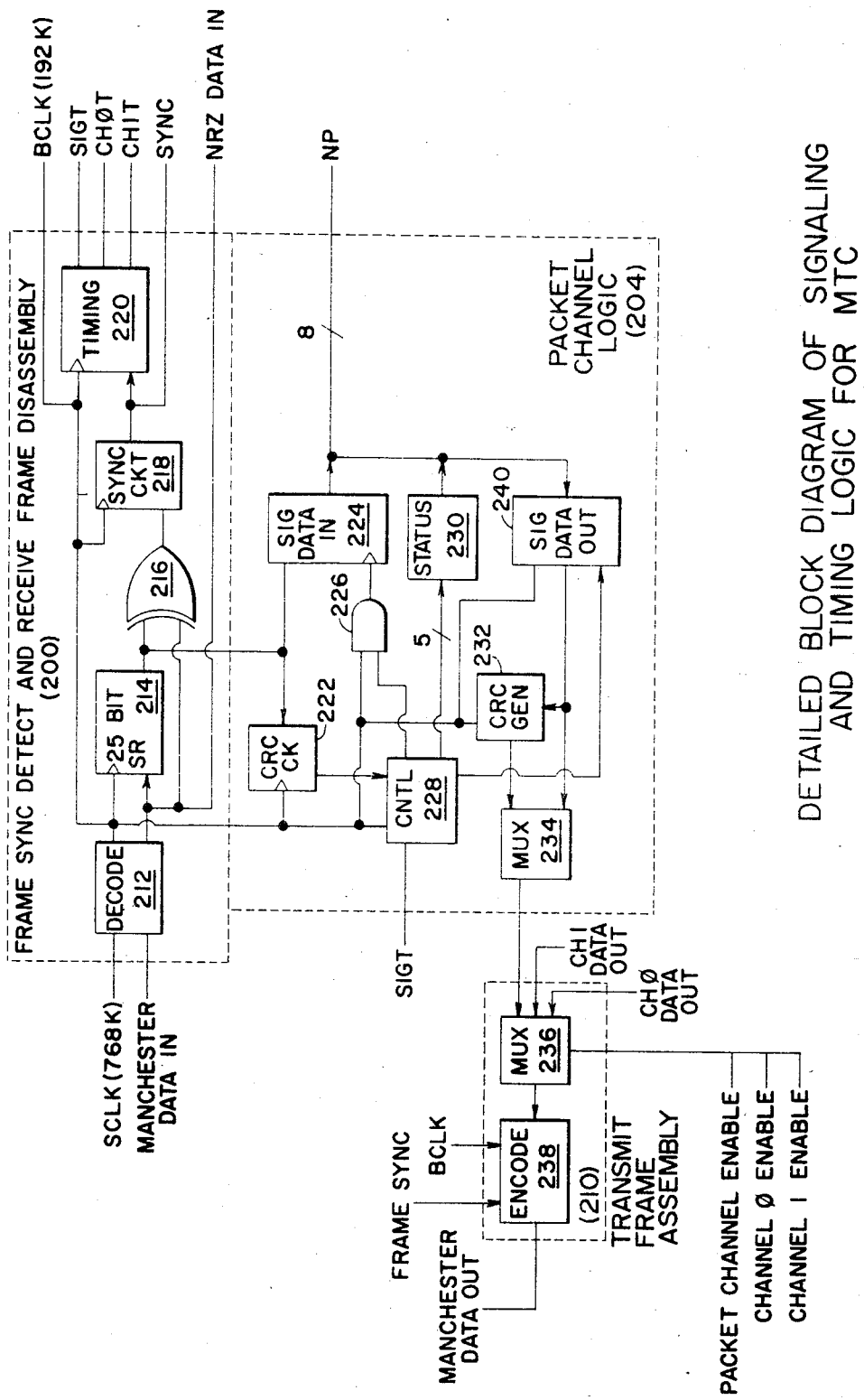

A more detailed description of various portions of channel 1 data communications encode, decode and clock generation logic 206. Each of the logic 206 is shown in FIGS. 12(d), (e) and (f). In FIG. 12(b), frame synchronization logic 200 is shown to contain a 25-bit shift register which is used for detecting the frame synchronization pattern. The outputs of timing module 220, labeled SIGT,CH∅T, and CHIT are the enable signals for the packet channel for channels zero and one, respectively. Packet channel logic 204 is shown to contain CRC check module 222 and a CRC generation module 232, which operate to properly interpret the fill character bit. A delay of one frame is introduced in the signaling data stream as shown in signal data in module 224. Data being transferred into signal data module 224 comes from the output of the twenty-five bit shift register 214, which introduces the appropriate frame of delay. Thus, when the fill character bit is on, the data stored in module 224 is not transferred to the microprocessor via the eight-bit port shown extending from the packet channel logic 204. The transmit frame assembly 210 includes two significant elements: manchester encode logic 238, and multiplexer 236. Manchester encode logic 238 requires frame synchronization and the 192 kbps B clock to encode. The data stream output from logic 238 is constructed from packet channel data bits coming from packet channel logic 204 along with channel one data and channel zero data. The enable signals also enter the multiplexer 236. FIG. 12(c) shows how the contents of channel zero logic 202 controls the codec port. Channel zero logic 202 contains AND gating logic 286 and 288, which enable data to or from the codec during the channel zero enable interval. The codec operates at the B clock rate of 192 kbps. Synchronization and gating are accomplished by the channel zero enable signal, CH∅T. A loop back capability is provided by multiplexers 290 and 292. In the diagnostics mode multiplexer 292 turns off the data flow to the data output connection to the codec port, and enables a path from AND gate 286 through AND gate 288 via multiplexer 290 back to the channel zero data output stream.

The data communication port on the MTC is shown in FIG. 12(a) adjacent to channel one logic 206. The data communication port consists of four signals: a transmit data signal (TXDATA), a transmit clock (TXCLOCK), a receive data signal (RXDATA) and a receive clock, (RXCLOCK). Those signals correspond to the data and clock signals of the RS-232 standard. Two broad modes of data communications are supported: asynchronous and synchronous. Two clocking modes of synchronous communications are supported. In the terminal mode, a single clock signal on the data communication port, RCLOCK, is used to clock data out of the RXDATA connection and to clock data into the TXDATA connection. The RXDATA clock is synchronized with the PBX internal highway clock and is derived from the line frequency of the incoming manchester data. The external clocking mode is one where the transmit data is clocked into the MTC with an independent clock, XCLOCK, and the receive data is clocked out of the MTC with an independent clock, RCLOCK.

There are typically two categories of supported data rates in the terminal mode. Standard data communications terminal speeds which are multiples of 600 bps, and data rates that are multiples of 8,000 bps for PBX rates. The specific terminal rates supported are 1,200, 2,400, 4,800, 9,600 and 19,200 bps. The PBX rates are 8,000, 16,000, 32,000, 64,000, and 128,000 bps. In the external clocking mode the terminals supported are 1,200, 2,400, 4,800, 9,600, and 19,200 bps.

Synchronous Encoding

The simplest mode of operation is synchronous transmission at the PBX clock rates. Referring to FIG. 12(d), data to be transmitted is applied to multiplexer 242 which directs the data stream to the input of shift register 248. The appropriate PBX clock rate is derived from the clock generation circuitry illustrated at FIG. 12(e), wherein the PBX clock is generated by applying the S clock signal to divide-by module 270 and 276, then outputting the PBX clock from programmable rate selector 282. The PBX clock is applied to multiplexer 240 and thence through multiplexer 246 to the clock input of shift register 248. If, for example, transmit data is operating at 32 kbps, then the PBX clock of 32 kHz will be derived by dividing the 768 kHz S clock by 24. Divide by module 270 performs a division by 6 and divide by module 276 performs a division by 4. The rate selector 282 may select one of five different speeds, and in this example selects 32 kHz. Data clocked at 32 kHz is transferred into the data communication encoder at four bits per frame, i.e, shift register 248 is controlled in a manner that allows four bits to be shifted once during each frame. At frame synchronization time, the contents of shift register 248 are parallel transferred into the buffer 252. The four-bit contents of buffer 252 are transferred into the shift register 262 via multiplexer 260.

The contents of shift register 262 is parallel loaded into the shift register 264 and clocked out at B clock rate of 192 kbps.

Asynchronous Encoding

In asynchronous mode, the shift register 248 receives terminal clock via multiplexer 246 and multiplexer 240 which, as shown in FIG. 12(e), is generated by divide-by modules 268 and 280, and rate selector 274. In the asynchronous mode of operation, a signal character includes a start bit, a number of data bits and one or more stop bits. When a start bit is detected, at start bit detector 244, the entire character, including the start bits, data bits and stop bits is clocked into shift register 248 under control of bit counter 250. Bit counter 250 is programmed for the number of bits per character from the CPU control port which in turn may be responsive to signals from the microprocessor that is part of the telephone, as described at FIG. 13. If, for example, a character includes a start bit, eight data bits, and a stop bit, the bit counter 250 will be programmed to accommodate ten-bit characters. After the start bit is detected by detector 244, ten bits will then be shifted into the shift register 248. After the tenth bit has been shifted into the register, the entire character may be parallel transferred into the asynchronous buffer 254. Data will be shifted from buffer 254 and into shift register 262 at the next higher PBX clock rate. Thus, if the ten bit character were shifted into register 248 at 9,600 bps, the character would be transmitted through the system in a 16 kbps channel that will be transported to the node at two bits per frame. Data would therefore be shifted out of buffer 254 and into register 262 at 16 kbps and two bits per frame would be loaded into shift register 264 where it would be rate multiplied to the B clock rate of 192 kbps for transmission to the node. During idling time an idling line padded with ones is the output. The asynchronous character is thereby rate converted from the terminal rate of 9,600 bps to the internal PBX rate of, for example, 16 kbps. The technique is similar when other terminal rates are utilized. For example a 4,800 bps asynchronous character may be transported through the system at 8,000 bps.

Having transmitted an asynchronous character at a PBX rate, the character must be decoded. After the incoming frame has been decoded by the frame synchronization logic 200 (FIG. 12(b), the data are shifted into shift register 296, shown in FIG. 12(f), buffered in shift register 300 and clocked out at the PBX clock rate. Thus, registers 296 and 300, in combination with multiplexer 298, performs a rate conversion from 192 kbps to the PBX data rate appropriate for this transmission. For example, if the terminal data rate is 9,600 bps, the incoming data rate will be 16 kbps encoded (carried) by the 192 kbps by shift register 296. The data rate is decoded or converted back to 16 kpbs by register 300. The asynchronous character being transmitted, at for example 16 kbps, is then applied to the start bit detector 312. Once a start bit has been detected a pre-programmed number of bits (i.e., the number of bits per character including start and stop bits) are shifted into shift register 320 and then parallel loaded into buffer 328. The character stored in buffer 328 is shifted out to the TX data pin through multiplexer 336 at the terminal rate selected by rate selector 330 and chained counters 318 and 316, which are being driven by a 1.536 MHz clock derived by a times-2 multiplication of the 768 kHz clock.

Received synchronous data may be decoded using logic largely common to the asynchronous decoding logic. Synchronous data are treated as eight-bit asynchronous characters including one start bit, six data bits and one stop bit. Thus, bit counter 250 in FIG. 12(d) and bit counter 314 in FIG. 12(f) are both, for example, set to eight bit counts. The simplest mode of synchronous communication is the terminal mode wherein the clock is provided by the MTC. For synchronous communications at 9,600 bps, a terminal clock derived from dividers 268 and 280 (FIG. 12(e)) and rate selector 274 will be applied to multiplexer 240. That clock rate will be provided the external equipment on the RX clock line from multiplexer 338. Thus, chained counter 316 and 318, and rate selector 330 are set to the same values as the previous divider chain. In synchronous encoding, multiplexer 246 bypasses start bit detector 244 and applies terminal clock rate from multiplexer 240 directly to the clock input of shift register 248. Synchronous transmit data is selected from multiplexer 242 directly to the input of shift register 248 whereupon bit counter 250 allows exactly six bits to be clocked into register 248. The six bits of data are stored in register 248, are parallel transferred to synchronization buffer 242 where a start bit and three stop bits are added forming the ten-bit character. At 16 kbps, a ten-bit character requires five frames for transmission. This ten-bit asynchronous character is transferred to shift register 262 via multiplexer 260 and then rate converted to the B clock rate of 192 kbps and transmitted at two bits per frame for the next five frames.

Synchronous Decoding

Reception of synchronous data follows the same process as for asynchronous data previously described. The start bit detector 312 encounters a start bit and bit counter 314, having been programmed for eight-bit characters, shifts the character minus two of its stop bits into shift register 320. The character is then buffered in buffers 322 and 326, and parallel transferred into shift register 332 where it is shifted out through the TXDATA port via multiplexer 336 at, in this example, 9,600 bps. The clock rate is derived from the chained counters 316 and 318 and rate selector 330, as previously described. This process may be used for all synchronous transmission, accommodating terminal rates from 1,200 bps to 19,200 bps.

Encoding Data Generated With External Clock For Synchronous Transmission To Node The most complex synchronous transmission scheme occurs when the transmitted data is accompanied with its own clock from an external source. In this case, TXCLOCK is selected by multiplexer 240 and applied to shift register 248 through multiplexer 246 in the same manner as previously described for terminal rates. Similarly, synchronous transmit data is selected by multiplexer 242 from the TXDATA port and applied to the input shift register 248. Again, six-bit characters are accumulated in shift register 248.

Because TXCLOCK will deviate by a small amount from the internally generated terminal clock, slippage will eventually occur. The nominal number of stop bits per character is three. If the incoming clock is somewhat fast, occasional corrections will be applied by transmitting characters with two stop bits. If TXCLOCK is slow, corrections will be made by transmitting characters with an extra stop bit, or four stop bits per character. Detection of the characters is accomplished in the same manner as previously described using stop bit detector 312 and bit counter 314. Bit counter 314 is set to eight bits and its output is provided to the stop bit counter 302. In addition, the start bit counter output is also provided to the stop bit counter 302. By timing the interval from the output of the bit counter to the next start bit, the number of stop bits on the previous character can be determined. When the number of stop bits is three, the control logic 304 selects the output of nominal frequency generator 308 to be applied to counter chain 316 and 318, and rate selector 330. At 9,600 bps synchronous transmission, the nominal frequency of 9,600 kHz is defined by dividing the reference frequency of 1.536 MHz by 160. The output of slow frequency generator 306 is determined by dividing the reference frequency by 161. The output of the fast frequency generator 310 is determined by dividing the reference frequency by 159. When a message arrives with only two stop bits, a correction of exactly 1 PBX clock time must be applied at 9,600 bps. The dept, i.e. one stop bit true, is retired in exactly 96 bit times. Thus, though the average value of RXCLOCK is equal to the frequency of TXCLOCK, those clocks may dynamically differ from a nominal clock to a fast or slow value for the exact number of bit times required to retire a time debt due to deviation from the nominal clock. The same technique may be utilized for transmission rates or clock rates other than 1.536 MHz. In all cases the clock rate selected is a multiple of both the terminal rate and the PBX clock rate (16 kHz) being employed as the data carrier High Speed Operation of MTC Other embodiments of the MTC may be utilized to handle the two high speed modes of operation of the QPLS. When the QPLS is operating in double frequency mode, the shift register 214 in FIG. 12(b) may be increased to forty-nine bits in length. In four times operation, the shift register 214 may be increased to a length of ninety-seven bits. Decode logic 212 requires a 1.536 MHz clock for two-times operation and a 3.072 MHz clock for four-times operation. In higher speed modes, the B clock may be either 384 kHz or 768 kHz. Timing logic 220 may be modified to cause the channel one enable signal (CH1T) to be gated on three times per frame for double speed operation, or seven times per frame for four times operation. The three data bytes in the double frame are thereby clocked out of the channel zero port at 384 kHz. The seven bytes from the quad frame are clocked out at 768 kHz.

FIG. 13 is a block diagram of a typical digital voice data telephone that communicates with the SIM. For such communication, the QPLS's may operate in normal or low speed mode and the peripheral loops at 192 kbps. The teleset is powered from the two pairs of wires from the station interface module. The line interface and power supply logic 227 derives the DC voltages necessary for teleset operation and also provides DC isolation. The data stream received from the SIM is typically biphase mark encoded, and thus has a transition for every bit time. Clock extract and multiply module 231 utilizes a phase lock loop to extract clock information from this biphase mark data stream, the output of which is a 768 kHz clock. The 768 kHz clock is provided to the microtelephone controller for synchronization of internal operations. Biphase mark encoded data is applied to the line input pin of the microtelephone controller and is available at the line output pin of the microtelephone controller (MTC) for transmission back to the SIM.

The information channel is demultiplexed and provided to the PCM codec 233 which is connected to the analog section of the telephone 235 where the necessary amplification of gain control as well as speakerphone logic are found. The MTC 229 is implemented to appear as memory to the microprocessor 237. The 32 kbps packet channel is decoded and/or encoded by the MTC 229 for incoming packet channel bytes. Interrupt is provided to the microprocessor 237 when each byte is available. In the output mode, the microprocessor writes the byte to be transmitted into a register location that remains in a busy state until the entire byte is transmitted, e.g. within two frames. Another information channel may be used for data communications.

The MTC, as described earlier, has logic which supports both synchronous and asynchronous data communication modes. In normal operation the teleset operates as a modem and provides clock for both receive and transmit data. For synchronous communication, two signals are active, i.e. receive data clock and transmit data clock. The receive data clock is derived as an integer deviser of the 768 kHz clock. Receive data and transmit data from the RS 232 connector are applied to a switch 241 whose outputs go to Uart 239 and/or to the MTC 229.

Switch 241 provides a number of capabilities to the telephone. When connections are established using the keyboard matrix on the telephone, receive data and transmit data from the RS 232 connector are switched directly through to the receive and transmit data lines from the MTC. However, switch 241 may also be configured to connect the transmit data line to the secondary transmit data line. In this configuration, the Uart 239 can monitor the data on the transmit line and look for a predetermined character, e.g. control W. When the special character is encountered the microprocessor 237 can change the configuration of the switch 241 to apply receive data and transmit data to the Uart 239, and not to MTC 229. In this configuration, terminal traffic is processed by the Uart 239 and the microprocessor 237 for transmission on the packet channel, all of which operate in the high-speed mode at 768 kbps.

The Video Interface Module (VIM) illustrated in FIG. 15 is substantially similar in structure and operation to the station interface module. The VIM 63 provides a structure for incorporating digitized video communication capacity to the system. VIM 63 differs from the construction of the SIM in that the QPLS's do not attach to the transmit and receive highways, but rather to the alternate transmit and receive highways in the general purpose bus. A second difference between the construction of VIM 63 and the SIM is that the VIM includes dual QPLS chips 243 operating in a highway-to-highway switching mode, carrying eight channels from the receive transmit highways to the alternate transmit and receive highways and the general purpose bus. The control processor section 110 is similar to that found in the SIM or the NIM and functions in a similar manner.

The VIM is used in fully redundant (i.e., dual ring) systems where dual counter directional network loops are employed and each node has two NIM's. Typically, the forward ring could carry circuit switched voice and data, and the backward ring could carry high-speed video channels operating at 448 kbps. In this manner the backward ring could carry seventy-two channels of 448 kbps digitized video that is accessible through the NIM on the alternate transmit and receive highways. The QPLSs, operating in high-speed mode, can switch 764 kbps channels for an aggregate of 448 kbps to the peripheral loop. A voice channel may be switched to and from the transmit and receive highways to the alternate highway and receive highways by the dual QPLS. In this manner each VIM supports eight integrated work stations with 448 kbps of digitized video, 64 kbps of digitized voice, and a 32 kbps packet channel.

What is claimed is:

1. A variable bandwidth private branch exchange system for interfacing a network ring and a plurality of local stations, said system comprising:
    means for communicating a network ring signal stream to an input port of a node connected to the network ring;
    means for determining that a local station connected to the node is being addressed by a remote station not connected to the node;
    means for assigning a discrete segment of the network ring signal stream for communication between the local station and the remote station such that at least one bit of the assigned segment of the network ring signal stream is used both to transmit data going from the remote station to the local station and from the local station to the remote station;
    means for disabling the normal network ring signal stream path through the node and enabling a network ring communication path to a local station when the assigned segment is accessible at the node, thereby disposing the local station in series electrical connection with the network ring signal stream;
    means for disabling the communication path to the local station and enabling the normal network ring signal stream path through the node after passing the assigned segment to the local station; and
    means for extracting the network ring signal stream from the output port of the node.

2. The system as recited in claim 1, wherein the signal stream communicated to the local station contains voice signals.

3. The system as recited in claim 1 wherein the signal stream communicated to the local station contains data signals.

4. The system as recited in claim 1 wherein a signal stream communicated to the local station contains voice and data signals.

5. The system as recited in claim 1 wherein the means for communicating a network ring signal stream to the input port of the system comprise high speed coaxial cable.

6. The system as recited in claim 1 wherein the means for determining whether a local station is being addressed includes means for communicating a control signal to the node, and means for comparing the control signal to a map of local stations addressable by the node.

7. A variable bandwidth private branch exchange system for interfacing a network ring and a plurality of local stations, said system comprising:
    means for communicating a network ring signal stream to an input port of a node connected to the network ring;
    means for determining that a local station connected to the node is being addressed by a remote station not connected to the node, said means for determining including means for communicating a control signal to the node, and means for comparing the control signal to a map of local stations addressable by the node, said means for comparing including a programmable steering map containing information specifying the correct signal stream path through the node for every bit of the signal stream;
    means for assigning a discrete segment of the network ring signal stream for communication between the local station and the remote station such that the assigned segment of the network ring signal stream is used both to transmit data going from the remote station to the local station and from the local station to the remote station;
    means for disabling the normal network ring signal stream path through the node and enabling a network ring communication path to a local station when the assigned segment is accessible at the node, thereby disposing the local station in series electrical connection with the network ring signal stream;
    means for disabling the communication path to the local station and enabling the normal network ring signal stream path through the node after passing the assigned segment to the local station; and
    means for extracting the network ring signal stream from the output port of the node.

8. The system as recited in claim 1 wherein the network ring communication path to the local station is normally disabled.

9. A variable bandwidth private branch exchange system for interfacing a network ring and a plurality of local stations, said system comprising;
    means for communicating a network ring signal stream to an input port of a node connected to the network ring;
    means for determining that a local station connected to the node is being addressed by a remote station not connected to the node;
    means for assigning a discrete segment of the network ring signal stream for communication between the local station and the remote station such that the assigned segment of the network ring signal stream is used both to transmit data going from the remote station to the local station and from the local station to the remote station;
    means for disabling the normal network ring signal stream path through the node and enabling a network ring communication path to a local station when the assigned segment is accessible at the node, thereby disposing the local station in series electrical connection with the network ring signal stream, said means for disabling the normal network ring signal stream path and enabling a network ring communication path including;
        means for monitoring the network ring signal stream sequence, said means for monitoring being operative to detect when assigned bit spaces corresponding to the discrete segment are accessible; and
        means for steering the network ring signal path onto the local ring when the assigned bit spaces are accessible;
    means for disabling the communication path to the local station and enabling the normal network ring signal stream path through the node after passing the assigned segment to the local station; and means for extracting the network ring signal stream from the output port of the node.

10. The system as recited in claim 9 wherein the means for disabling the normal network ring signal stream path and enabling a network ring communication path further include means for controlling the number of bit times that the network ring signal path is steered to the local station.

11. The system as recited in claim 10 wherein said means for controlling the number of bit times that the network ring signal path is steered to the local station is responsive to a steering control signal corresponding to the rate of bits per frame allocated for service of the identified local station.

12. The system as recited in claim 11 wherein said steering control signal is responsive to the level of activity at the local station, thereby allowing dynamic modification of the number of bit times that the network ring signal stream is steered to local station.

13. The system as recited in claim 11 wherein said steering control signal is generated at the local station circuitry and communicated to the means for controlling the number of bit times that the network ring signal path is to be enabled.

14. The system as recited in claim 13 further including means for encoding the steering control signal into a signal stream from the local station for communication to said means for controlling the number of bit times that the network ring signal path to the local station is to be enabled.

15. The system as recited in claim 1 wherein the network ring signal stream communicated to the node input port includes data signals and control signals.

16. The system as recited in claim 15 wherein the means for determining whether a local station is addressed include demultiplexer means for separating data signals from control signals in the network ring signal stream.

17. The system as recited in claim 16 wherein the network ring signal stream comprises a 12-bit signal including eight bits of data signal and four bits of control signal.

18. The system as recited in claim 1 further including means for communicating a control signal to the node along a communication path distinct from the network ring signal stream communication path.

19. The system as recited in claim 18 wherein said means for communicating a control signal comprises an Ethernet bus.

20. The system as recited in claim 1 further including means for deriving timing signals from the network ring signal stream for operating the node at a rate compatible with the network ring signal stream rate.

21. The system as recited in claim 20 further including means for communicating the derived timing signal to the local station, and means for operating the local station at a rate compatible with the derived timing signal.

22. The system as recited in claim 1 further including means for generating master clock and master synchronization signals for transmission from the node to the network ring for synchronization of the network ring to a common timing scheme.

23. The system as recited in claim 1 wherein the local station includes a timing system slaved to the derived clock signal.

24. The system as recited in claim 1 wherein the local station includes a timing system having timing means independent of the derived clock signal.

25. A variable bandwidth private branch exchange system for interfacing a network ring and a plurality of local, stations, each of the local stations being connected to a node on the network ring, said system comprising:
means for serially communicating a network ring signal stream to an input port of each node such that the network ring signal stream always proceeds in the same node order;
means for determining whether a local station is addressed by a signal from a remote station;
means for monitoring the utilization of bit spaces in the network ring signal stream;
first microprocessor means operative to designate the bit space requirement for the local station addressed;
means for assigning a number of available bit spaces in the network ring signal stream for communication with the addressed local station;
means for limiting the number of assigned bit spaces to the designated bit space requirement; and
means for enabling the network ring signal stream communications path to the addressed local station when the assigned bit spaces are accessible at the node.

26. The system as recited in claim 25 wherein the means for monitoring the utilization of bit spaces in the network ring signal stream includes means for monitoring the availability of 8-bit bytes in a signal stream frame.

27. The system as recited in claim 26 wherein each signal stream frame includes 512 8-bit bytes.

28. The system as recited in claim 26 further including means for deriving a clock signal and a frame synchronization signal from the network ring signal stream for operating the node at a rate compatible to the network ring signal stream rate.

29. The system as recited in claim 28 wherein the bit space requirement designated by the first microprocessor means may be adjusted in accordance with the activity at the local station.

30. The system as recited in claim 29 wherein the local station includes means for generating a local status signal responsive to the level of activity at the local station, and means for communicating said status signal to said first microprocessor means.

31. The system as recited in claim 30 wherein said means for communicating said local station status signal include means for encoding said status signal into the signal stream from the local station.

32. The system as recited in claim 29 wherein the bit space requirement designated by the first microprocessor means is static for a particular local station.

33. A variable bandwidth private branch exchange system for interfacing a network ring and a plurality of local stations, each of the local stations being connected to a node on the network ring, said system comprising:
means for serially communicating a network ring signal stream to an input port of each node such that the network signal stream always proceeds in the same node order;
means for determining whether a local station is addressed by a signal from a remote station;
means for monitoring the utilization of bit spaces in the network ring signal stream, said means including means for monitoring the availability of 8-bit bytes in a signal stream frame;

first microprocessor means operative to designate the bit space requirement for the local station addressed;

means for assigning a number of available bit spaces in the network ring signal stream for communication with the addressed local station;

means for limiting the number of assigned bits to the designated bit space requirements; and means for enabling the network ring signal stream communications path to the addressed local station when the assigned bits are accessible at the node, said means including means for monitoring the bit sequence of the network ring signal stream as it enters the node and means for indicating that the assigned bit spaces are accessible.

34. The system as recited in claim 33 wherein the steering means are operative to disable the normal network ring signal stream path and enable a signal path to the local station in response to a signal from the means for indicating that the assigned bit spaces are accessible at the node.

35. The system as recited in claim 34 wherein the means for assigning a number of available bit spaces includes first microprocessor means operative to designate the bit space requirement for a local station, and means for limiting the number of assigned bit spaces to the designated bit space requirement.

36. The system as recited in claim 35 wherein the means for indicating that the assigned bit spaces are accessible is responsive to the means for deriving a clock signal and a frame synchronization signal from the network ring signal stream.

37. The system as recited in claim 35 wherein the means for indicating that the assigned bit spaces are accessible include read and write memory means, said memory means being loaded with information representative of the current utilization of every bit of the network ring signal stream.

38. The system as recited in claim 35 wherein the means for indicating that the assigned bit spaces are accessible include means for comparing the monitored bit sequence of the network ring signal stream to a map of assigned bit spaces, and means for generating a gate enablement signal when the monitored bit sequence corresponds to the assigned bit spaces.

39. The system as recited in claim 38 wherein the means for assigning a number of available bit spaces includes first microprocessor means operative to designate the bit space requirement for each of a plurality of local stations, and means for loading the read and write memory means with information limiting the number of assigned bit spaces to the designated bit space requirement.

40. The system as recited in claim 35 wherein a plurality of nodes are disposed along the network ring, each of said nodes acting as the interface between the network and a local station.

41. A variable bandwidth private branch exchange system for interfacing a distributed network ring and a plurality of local stations, each of the local stations being connected to a common node on the network ring, said system comprising:

means for serially communicating a network ring signal stream to an input port of each of a plurality of nodes, such that the network ring signal stream always proceeds in the same node order;

means for assigning a discrete segment of the bit spaces of the network ring signal stream for communication between a local station and a remote station, said assigning means being operative to dedicate at least one bit of the assigned bit spaces of the network ring signal stream through each node to be used both to transmit data going from the remote station to the local station and from the local station to the remote station;

means for determining that a local station is being addressed by a remote station not connected to the common node;

means for enabling a network ring signal stream communication path to the local station when the assigned segment is accessible at the node, thereby disposing the local station in series electrical connection with the network ring signal stream; and means for disabling the communication path to said local station after passing the assigned segment of the signal stream to the identified local station.

42. A method of communicating information between a distributive network ring and a plurality of local stations, said method comprising:

communicating a network ring signal stream to an input port of a node connected to the network ring;

deriving a clock signal and a frame synchronization signal from the signal stream for operating the node at a rate compatible with the signal stream rate;

determining whether a local station connected to the node is being addressed by a remote station connected to another node on the network ring;

assigning a number of bit spaces of the network ring signal stream for communication between the local station and the remote station such that at least one of the assigned bit spaces of the network ring signal stream is used both to transmit data going from the remote station to the local station and from the local station to the remote station;

disabling the normal network ring signal stream communication path through the node and enabling a network ring signal stream communication path to the local station when the information in said segment identifies the local station, thereby disposing said local station in series electrical connection with the network ring signal stream; and disabling the communications path to said local station and enabling the normal network ring signal stream communication path through the node after the assigned bit spaces are passed onto the local ring to the addressed local station.

43. A variable bandwidth private branch exchange system for interfacing a network ring and a plurality of local stations, said system comprising:

means for serially communicating a network ring signal stream to an input port of each of a plurality of nodes such that the network ring signal stream always proceeds in the same node order;

means for determining whether a local station is addressed by a signal from a remote station;

means for monitoring the utilization of bit spaces in the network ring signal stream;

first microprocessor means operative to designate the bit space requirement for the local station addressed;

means for assigning a number of available bit spaces in the network ring signal stream for communication with the addressed local station, said assigning means being operative to dedicate at least one bit of the assigned bit spaces of the network ring signal stream to each node to be used both to transmit data going from the remote station to the local station and from the local station to the remote station;

means for limiting the number of assigned bit spaces to the designated bit space requirement; and means for enabling the network ring signal stream communications path to the addressed local station when the assigned bit spaces are accessible at the node.

44. A variable bandwidth private branch exchange system for interfacing a network ring in a plurality of local stations, said system comprising:

means for communicating a network ring signal stream to an input port of a common node;

means for determining that a local station connected to the common node is being addressed by a remote station not connected to the common node;

means for assigning a discrete segment of the network ring signal stream for communications between the local station and the remote station;

means for disabling the normal network ring signal stream path through the common node and enabling a network ring signal stream path to a local station when the assigned segment is accessible at the common node, thereby disposing the local station in series electrical connection with the network ring signal stream;

means for disabling the communications path to the local station and enabling the normal network ring signal stream path through the common node after passing the assigned segment to the local station;

means for communicating signals between a plurality of local stations connected to the common node without disabling the normal network ring signal stream path through the common node; and means for extracting the network ring signal stream from the output port of the common node.

45. The system as recited in claim 25 further including means for communicating signals between a first local station and a second local station without disabling the normal network signal stream communications path through the node.

46. The system as recited in claim 25 wherein said assigning means is operative to dedicate the assigned bit spaces of said network ring signal stream passing through each node to a single full duplex communication.

47. The system as recited in claim 41 further including means for communicating signals between a first local station and a second local station without disabling the normal network signal stream communications path through the common node.

48. A method of communicating information between a distributive network ring and a plurality of local stations, said method comprising:

communicating a network ring signal stream to an input port of a node connected to the network ring;

deriving a clock signal and a frame synchronization signal from the signal stream for operating the node at a rate compatible with the signal stream rate;

determining whether a local station connected to the node is being addressed by a remote station connected to another node on the network ring;

assigning a number of bit spaces of the network ring signal stream for communication between the local station and the remote station such that the assigned bit spaces of the network ring signal stream are used both to transmit data going from the remote station to the local station and from the local station to the remote station;

disabling the normal network ring signal stream communication path through the node and enabling a network ring signal stream communication path to the local station when the information in said segment identifies the local station, thereby disposing said local station in series electrical connection with the network ring signal stream;

disabling the communications path to said local station and enabling the normal network ring signal stream communication path through the node after the assigned bit spaces are passed onto the local ring to the addressed local station; and enabling a local signal stream communication path to effect intranode communications between local stations connected to a common node without disabling the normal network ring signal stream communication path through the node.

49. A variable bandwidth private branch exchange system for interfacing a network ring and a plurality of local stations, said system comprising:

means for serially communicating a network ring signal stream to an input port of each of a plurality of nodes such that the network ring signal stream always proceeds in the same node order;

means for determining whether a local station is addressed by a signal from a remote station;

means for monitoring the utilization of bit spaces in the network ring signal stream;

first microprocessor means operative to designate the bit space requirement for the local station addressed;

means for assigning a number of available bit spaces in the network ring signal stream for communication with the addressed local station, said assigning means being operative to dedicate the assigned bit spaces of the network ring signal stream to each node to be used both to transmit data going from the remote station to the local station and from the local station to the remote station;

means for limiting the number of assigned bit spaces to the designated bit space requirement;

means for enabling the network ring signal stream communications path to the addressed local station when the assigned bit spaces are accessible at the node; and means for communicating signals between a first local station and a second local station without disabling the normal network signal stream communications path through the node.

* * * * *